United States Patent [19]
Motomura

[11] Patent Number: 5,958,043
[45] Date of Patent: Sep. 28, 1999

[54] SUPERSCALAR PROCESSOR WITH FORWARD MAP BUFFER IN MULTIPLE INSTRUCTION PARALLEL ISSUE/ EXECUTION MANAGEMENT SYSTEM

[75] Inventor: Masato Motomura, Tokyo, Japan

[73] Assignee: NEC Corporation, Tokyo, Japan

[21] Appl. No.: 08/916,156

[22] Filed: Aug. 21, 1997

[30] Foreign Application Priority Data

Aug. 30, 1996 [JP] Japan .................................. 8-249163

[51] Int. Cl.$^6$ ...................................................... G06F 9/38
[52] U.S. Cl. ............................................. 712/216; 712/23
[58] Field of Search ............................. 395/392, 800.23; 712/216, 23

[56] References Cited

U.S. PATENT DOCUMENTS

| | | | |
|---|---|---|---|
| 5,555,432 | 9/1996 | Hinton et al. | 395/800.23 |
| 5,710,902 | 1/1998 | Sheaffer et al. | 395/392 |
| 5,802,386 | 9/1998 | Kahle et al. | 395/800.23 |

FOREIGN PATENT DOCUMENTS

| | | |
|---|---|---|
| 651321 | 5/1995 | European Pat. Off. . |
| 685789 | 12/1995 | European Pat. Off. . |

OTHER PUBLICATIONS

"Superscalar Microprocessor Design", Prentice Hall Series in Innovative Technology, Mike Johnson, pp. 30–55.

Primary Examiner—Kenneth S. Kim
Attorney, Agent, or Firm—Suhgrue, Mion, Zinn, Macpeak & Seas, PLLC

[57] ABSTRACT

A multiple instruction parallel issue/execution management system including a forward map buffer for storing forward map information indicating whether or not the result value generated by execution of a given instruction is used an input operand in other instructions. The forward map buffer previously stores the forward map information for the result value, before the result value corresponding to the given instruction is actually generated, and when the result value corresponding to the given instruction is actually generated, the operands using the result value are specified by using the previously stored forward map information corresponding to the result value, and supplied to an instruction using the result value as an input operand.

13 Claims, 26 Drawing Sheets

Fig. 3A INSTRUCTION FORMAT 1

- ARITHMETIC OPERATION INSTRUCTION
- MEMORY ACCESS INSTRUCTION

| INSTRUCTION CODE | RESULT VALUE REGISTER | LEFT OPERAND REGISTER | RIGHT OPERAND REGISTER | FORWARD MAP INFORMATION |
|---|---|---|---|---|

Fig. 3B INSTRUCTION FORMAT 2

- ARITHMETIC OPERATION INSTRUCTION
- MEMORY ACCESS INSTRUCTION

| INSTRUCTION CODE | FORWARD MAP EXTENSION FLAG | FORWARD MAP INFORMATION | RESULT VALUE REGISTER | LEFT OPERAND REGISTER | RIGHT OPERAND REGISTER | FORWARD MAP INFORMATION |
|---|---|---|---|---|---|---|

Fig. 3C INSTRUCTION FORMAT 3

- ARITHMETIC OPERATION INSTRUCTION
- MEMORY ACCESS INSTRUCTION

| INSTRUCTION CODE | REGISTER | FORWARD MAP INFORMATION |
|---|---|---|

- REGISTER ACCESS INSTRUCTION

| INSTRUCTION CODE |
|---|

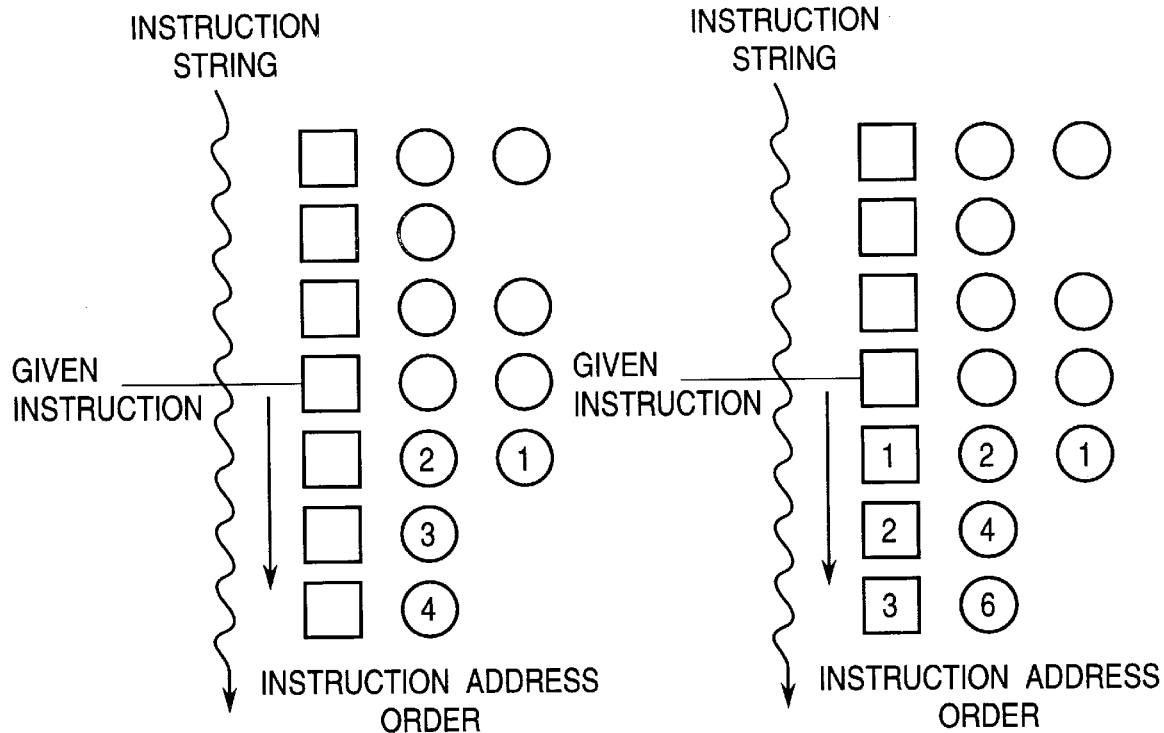
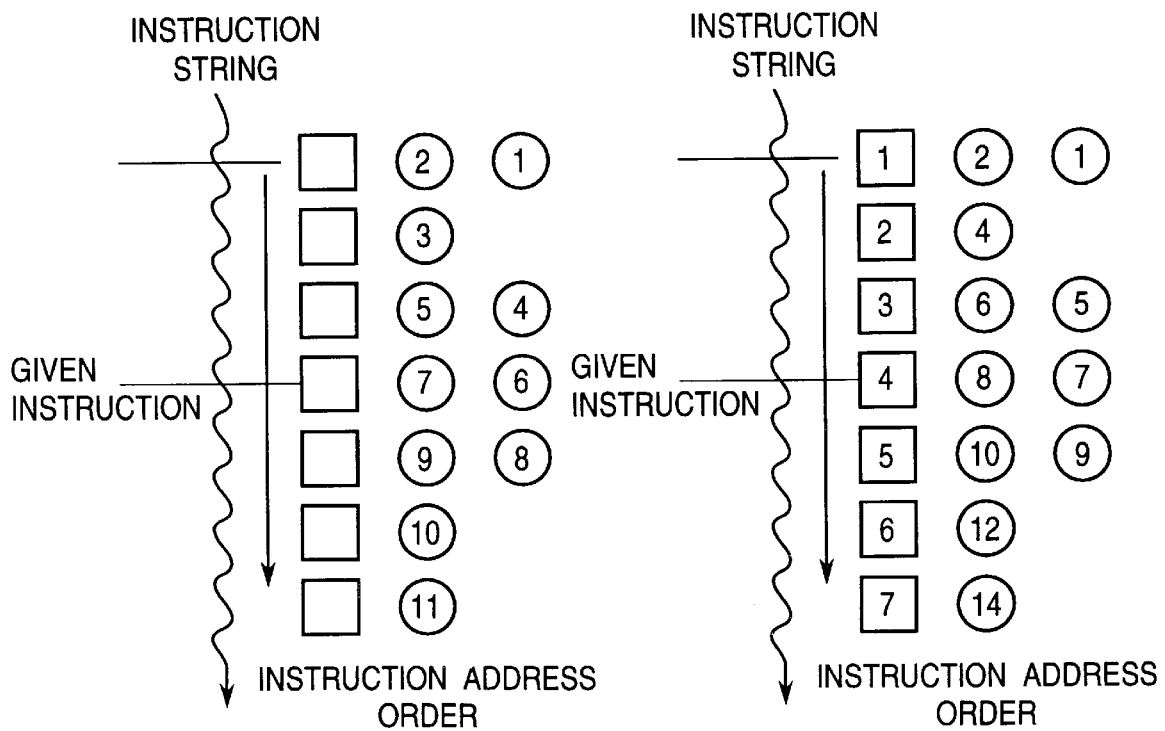

Fig. 8

| ABBR. | MEANING | DESCRIPTION |
|---|---|---|
| em | Empty | EMPTY CONDITION HAVING NO EFFECTIVE INSTRUCTION |
| - | Not Ready | CONDITION BEFORE CHECKING ISSUABILITY |
| rd | Ready | INSTRUCTION IS ISSUABLE |
| wa | Waiting | WAIT FOR ISSUANCE OF INSTRUCTION |
| is | Issued | INSTRUCTION HAS BEEN ISSUED |

Fig. 9

| ABBR. | MEANING | DESCRIPTION |
|---|---|---|
| em | Empty | EMPTY CONDITION HAVING NO EFFECTIVE INSTRUCTION |
| ni | Not Issued | INSTRUCTION HAS NOT YET BEEN ISSUED |
| ex | Executing | INSTRUCTION IS BEING EXECUTED |
| es | Executing on Speculation | INSTRUCTION IS BEING EXECUTED ON SPECULATION |
| do | Done | EXECUTION OF INSTRUCTION HAS BEEN ENDED |
| ds | Done on Speculation | EXECUTION OF INSTRUCTION HAS BEEN ENDED ON SPECULATION |

MEMORY ACCESS INSTRUCTION | IF | ID | DP | EX1 | EX2 | WB

ARITHMETIC OPERATION INSTRUCTION /BRANCH INSTRUCTION | IF | ID | DP | EX2 | WB

|  | ID | DP | EX2 | WB |
|---|---|---|---|---|
| FIRST HALF OF CYCLE | — | OPERAND REGISTRATION | OPERAND FORWARDING RESERVATION | EXECUTION ENDING |
| SECOND HALF OF CYCLE | INSTRUCTION REGISTRATION | INSTRUCTION ISSUE | OPERAND BYPASSING | OPERAND FORWARDING |

Fig. 13

| | | | | |
|---|---|---|---|---|
| L1 : | add | r2 r3 | 00\|10\|00\|00\|00 | : L5L ← r2 + r3 ; 5 |
| L2 : | load | r5 | 00\|00\|00\|00\|01 | : L3R ← MEM[r5] ; 8 |
| L3 : | add | r2 | 00\|00\|10\|00\|00 | : L6L ← r2 + ___ ; 10 |
| L4 : | or | r5 r3 | 00\|01\|01\|00\|01 | : L5R : L7R : L8R ← r5 OR r3 ; 7 |
| L5 : | and | | 00\|10\|00\|10\|00 | : L7L : L9L ← ___ AND ___ ; 5 |
| L6 : | load | | 00\|00\|01\|10\|00 | : L8L : L9R ← MEM[___] ; 11 |
| L7 : | add | r5 | 00\|00\|00\|00\|00 | : r5 ← ___ + ___ ; 12 |
| L8 : | branch | L1 | 00\|00\|00\|00\|00 | : Goto L1 If (___ == ___) ; |
| L9 : | store | | 00\|00\|00\|00\|00 | : MEM[___] ← ___ ; |

Fig. 14

| r0 | r1 | r2 | r3 | r4 | r5 | r6 | r7 |
|---|---|---|---|---|---|---|---|
| 0 | 1 | 2 | 3 | 4 | 5 | 6 | 7 |

Fig. 15

| | | | t= | 0 | 1 | 2 | 3 | 4 | 5 | 6 | 7 | 8 | 9 | 10 |
|---|---|---|---|---|---|---|---|---|---|---|---|---|---|---|
| L1 : add | r2 | r3 | 00\|10\|00\|00\|00 | IF | ID | DP | EX2 | WB | | | | | | |
| L2 : load | r5 | | 00\|00\|00\|00\|01 | | IF | ID | DP | EX1 | EX2 | WB | | | | |
| L3 : add | r2 | | 00\|00\|10\|00\|00 | | IF | ID | DP | DP | EX2 | WB | | | | |
| L4 : or | r5 | r3 | 00\|01\|01\|00\|01 | | | IF | ID | DP | EX2 | WB | | | | |
| L5 : and | | | 00\|10\|00\|10\|00 | | | IF | ID | DP | DP | EX1 | EX2 | WB | | |
| L6 : load | | | 00\|00\|01\|10\|00 | | | IF | ID | DP | DP | EX2 | WB | | | |
| L7 : add | | | 00\|00\|00\|00\|00 | | | | IF | ID | DP | DP | DP | EX2 | WB | |
| L8 : branch | r5 | L1 | 00\|00\|00\|00\|00 | | | | IF | ID | DP | DP | DP | EX1 | EX2 | WB |
| L9 : store | | | 00\|00\|00\|00\|00 | | | | IF | ID | DP | DP | DP | DP | EX1 | EX2 | WB |

Fig. 17
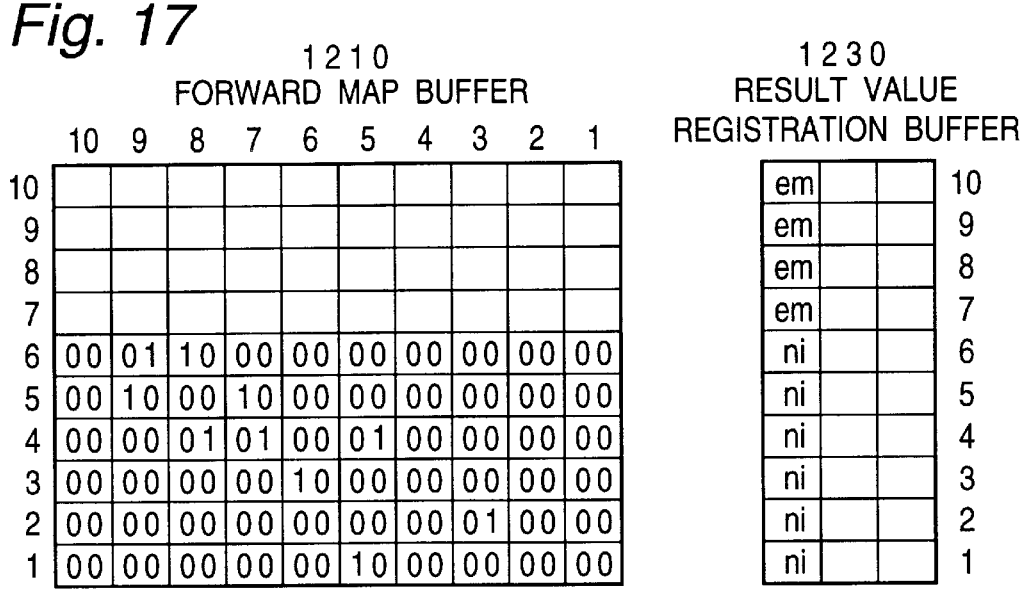
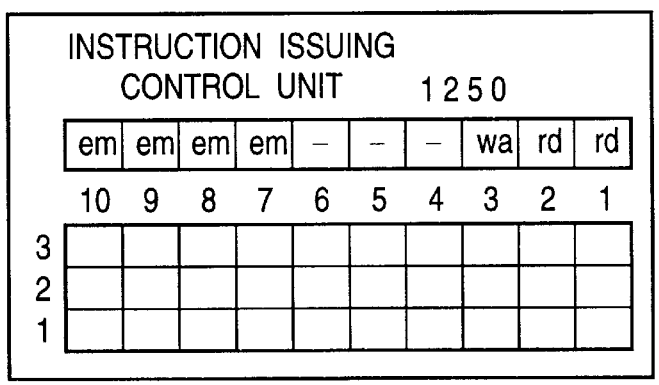
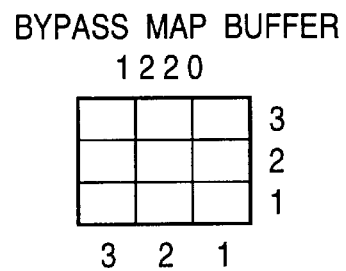
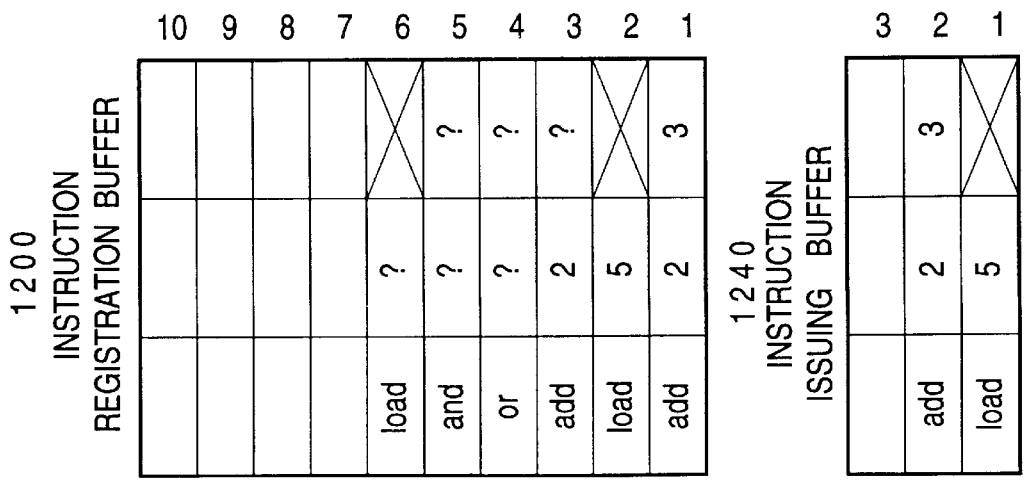
t = 2

Fig. 18
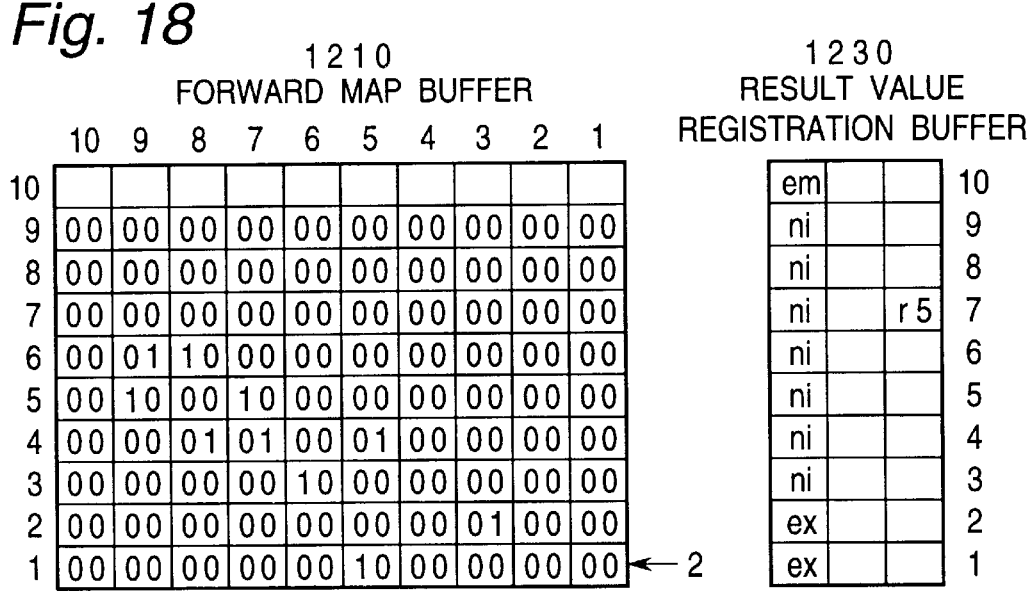
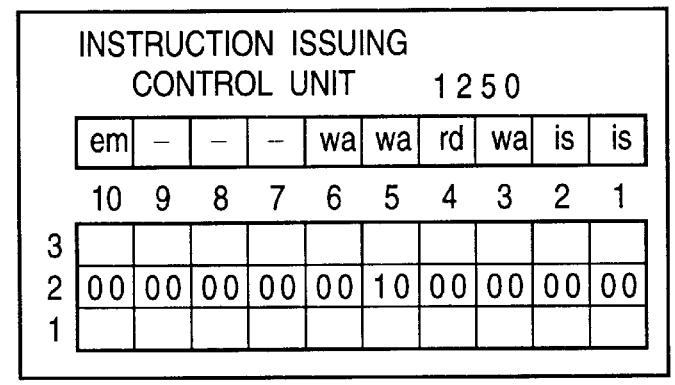
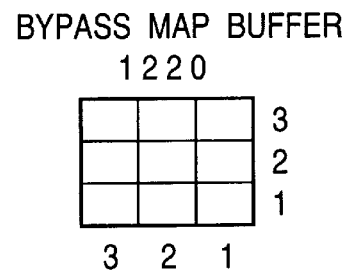
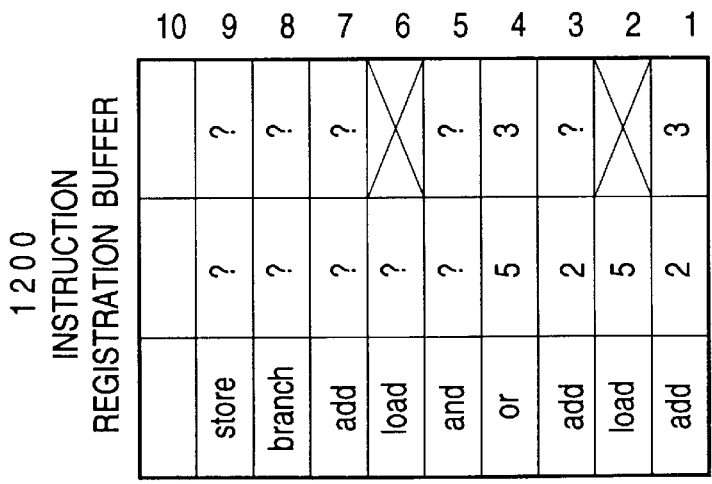
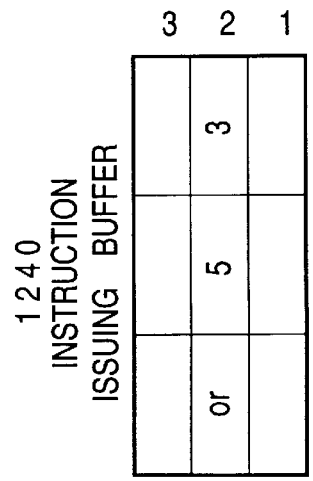
t = 3

Fig. 19
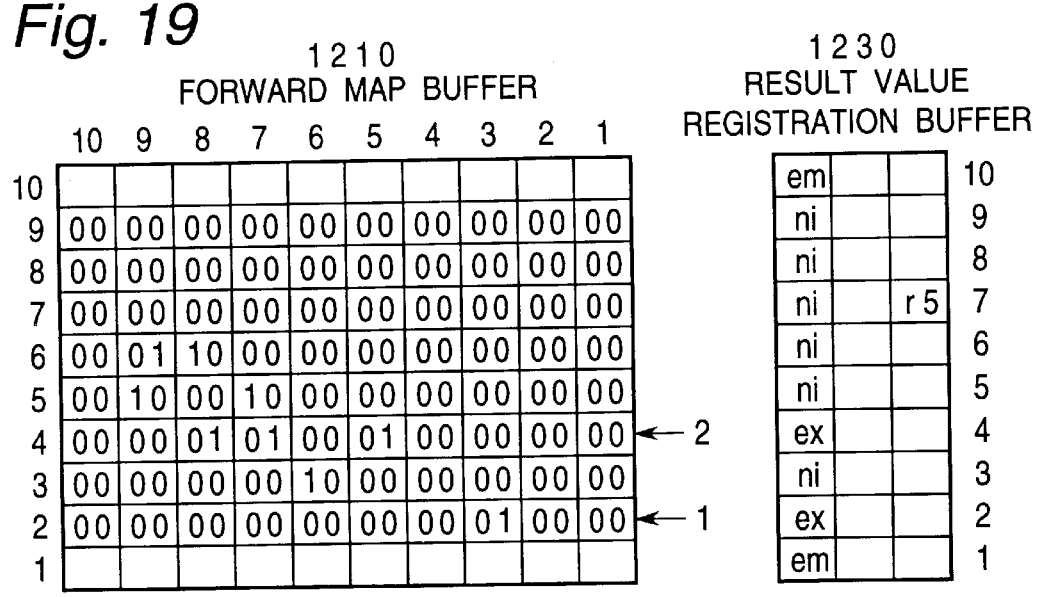
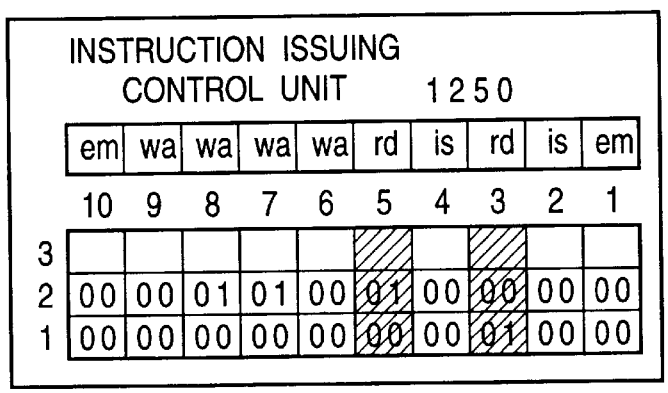
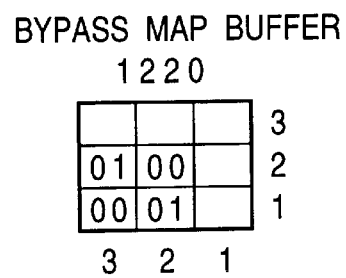
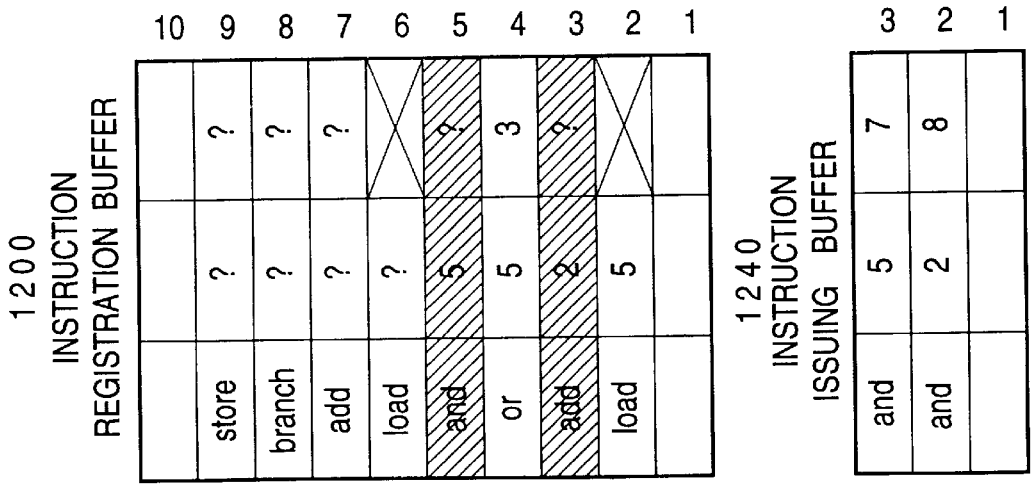
t = 4

Fig. 20
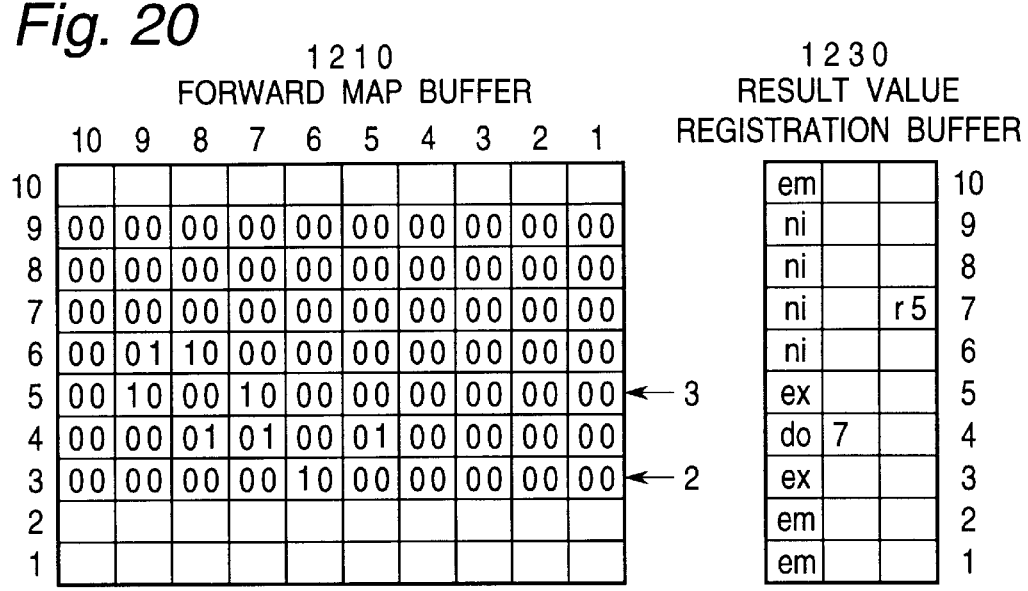
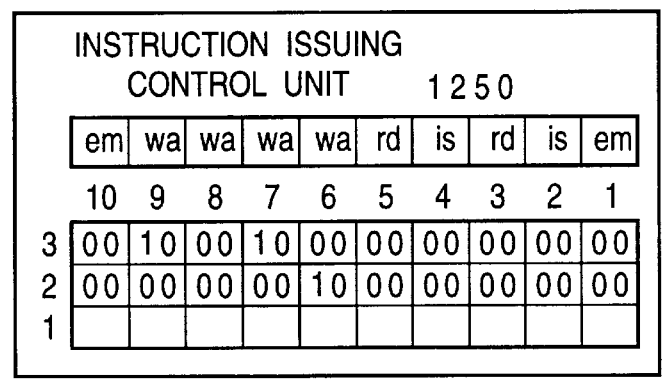
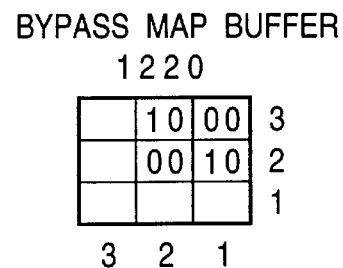
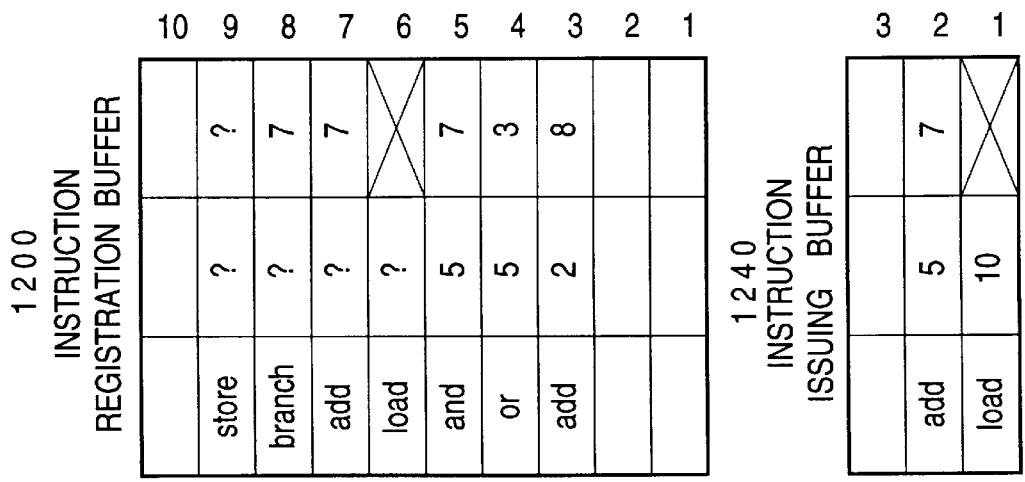
t =5

Fig. 21
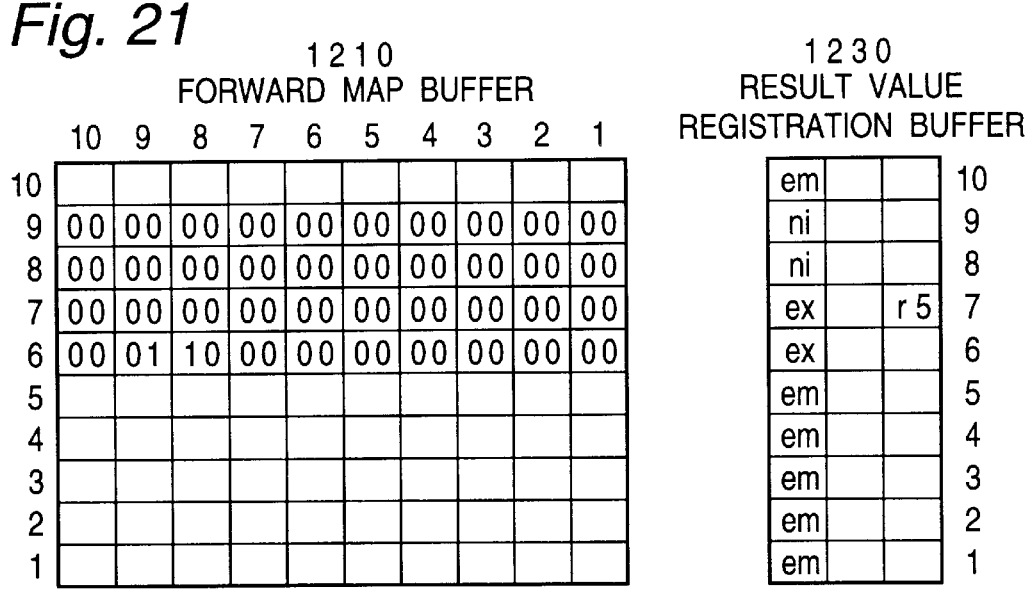
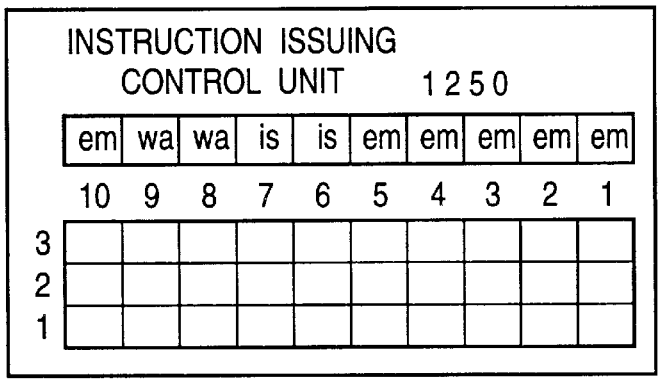
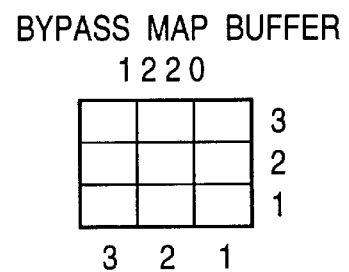
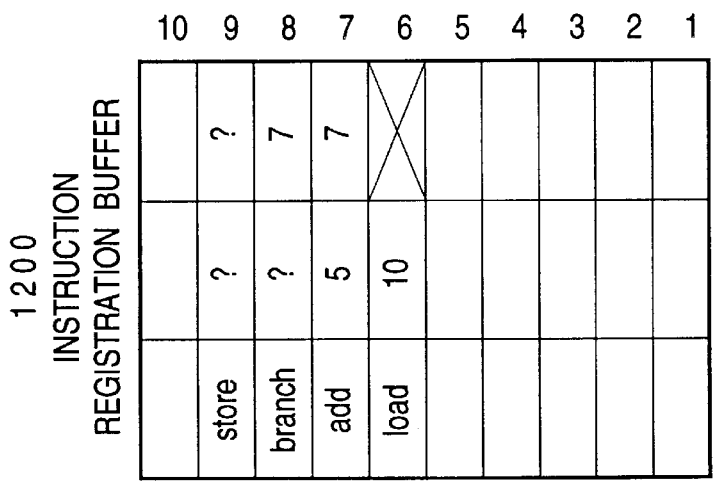
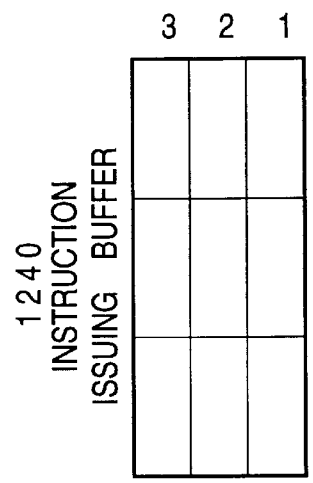
t = 6

Fig. 22
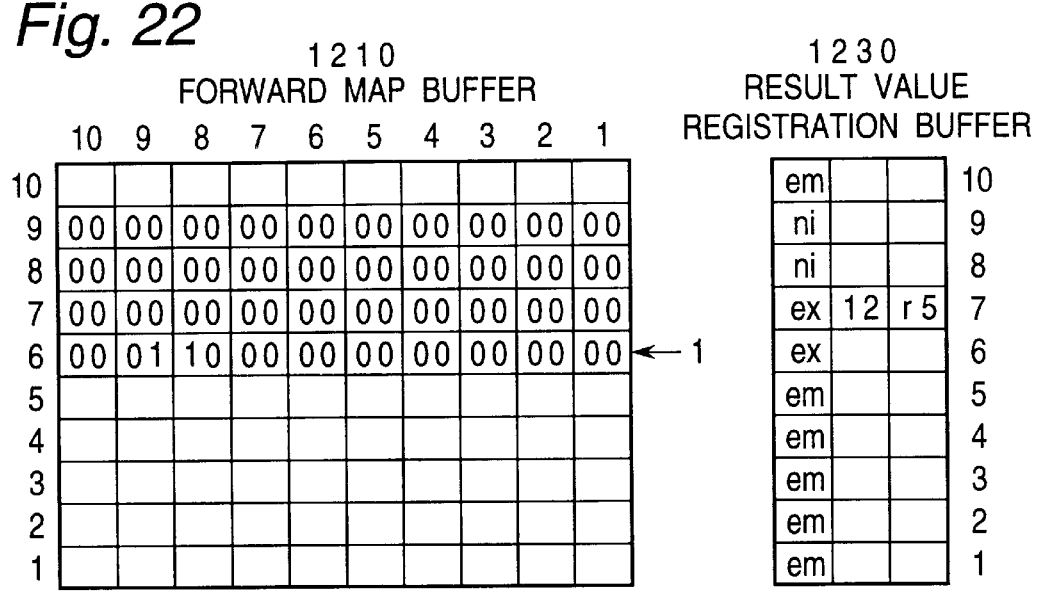
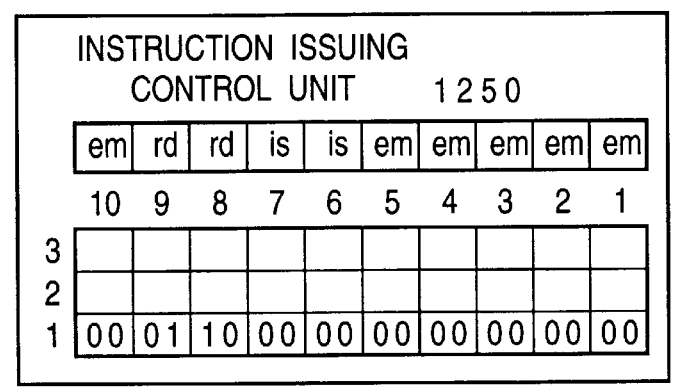
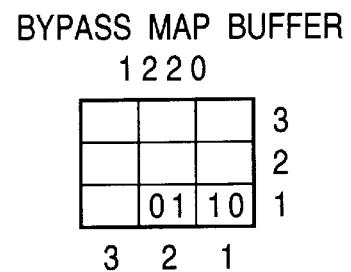
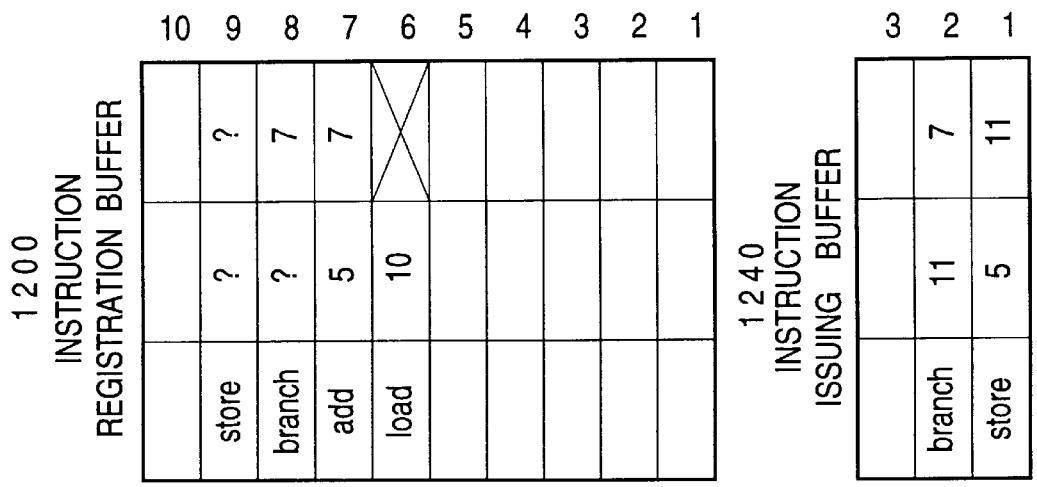
t = 7

Fig. 23
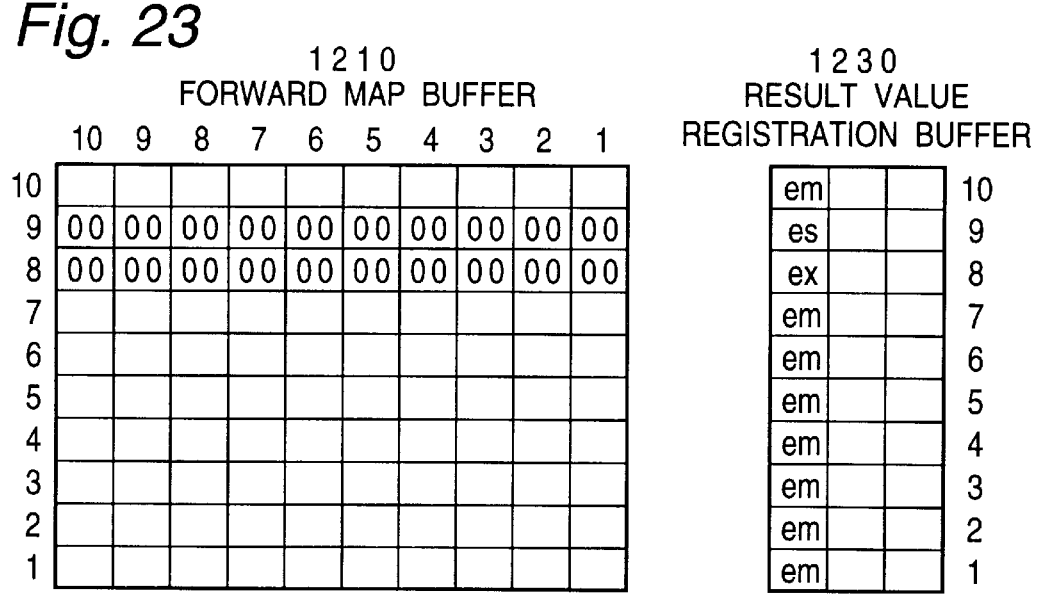
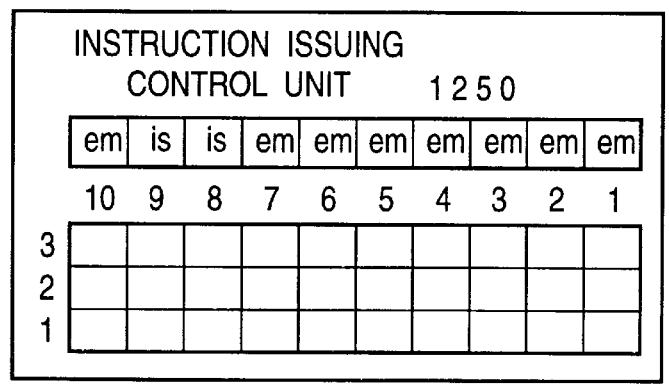
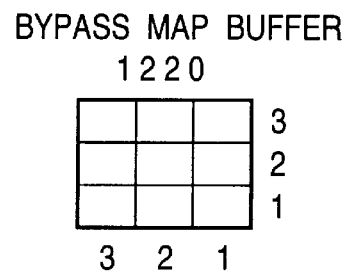
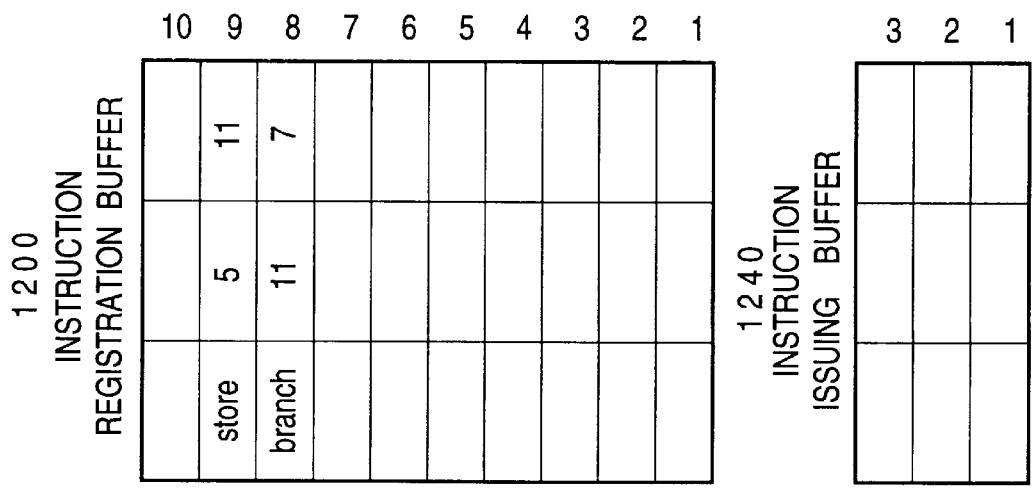
t = 8

Fig. 29   12   MULTIPLE INSTRUCTION PARALLEL ISSUE/EXECUTION MANAGEMENT UNIT

SUPERSCALAR PROCESSOR WITH FORWARD MAP BUFFER IN MULTIPLE INSTRUCTION PARALLEL ISSUE/EXECUTION MANAGEMENT SYSTEM

BACKGROUND OF THE INVENTION

1. Field of the Invention

The present invention relates to a multiple instruction parallel issue/execution management system, provided in a superscalar processor of dynamically issuing a plurality of instructions in parallel and of executing the plurality of instructions in parallel, and for managing the issuing and execution of the plurality of instructions.

2. Description of Related Art

A technology called a "superscalar" is widely used for elevating the performance of a general-purpose processor, in particular, a microprocessor. The superscalar technology is featured so that, when individual instructions included in an instruction string are sequentially fetched, decoded, issued and executed, a plurality of instructions are fetched and decoded in parallel, and from decoded instructions, a plurality of executable instructions are dynamically designated and issued to a plurality of arithmetic and logic units and a memory access unit in parallel so that the instructions are executed in parallel. The conventional superscalar technology is described in detail by Mike Johnson, "Superscalar Microprocessor Design", published by Prentice Hall.

In the conventional superscalar microprocessor using the superscalar technology, a multiple instruction parallel issue management unit and a multiple instruction parallel execution management unit have an extremely important role for realizing the above mentioned parallel processing. The multiple instruction parallel issue management unit is called a "reservation station", and the multiple instruction parallel execution management unit is called a "reorder buffer".

The multiple instruction parallel issue management unit performs an operation of temporarily holding a plurality of decoded instructions, discriminating whether or not each of the held decoded instructions is issuable, and selecting and issuing some number of instructions from issuable instructions, and continuing to hold non-issuable instructions in the multiple instruction parallel issue management unit to re-check whether or not each of the instructions are issuable.

Referring to FIG. 30, there is shown a block diagram illustrating a fundamental construction of the prior art multiple instruction parallel issue/execution management unit. The shown multiple instruction parallel issue/execution management unit comprises a plurality of not-yet-issued instruction entries 2501 and an issue control unit 2502. Each of the not-yet-issued instruction entries 2501 includes an instruction tag field 25011, an instruction code field 25012, a first operand/tag field 25013, a second operand/tag field 25014, a comparator 25015, and another comparator 25016. Furthermore, the shown multiple instruction parallel issue/execution management unit comprises an instruction tag input terminal 2503, an instruction code input terminal 2504, a first operand/tag register input terminal 2505, a first tag comparison input terminal 2506, a second operand/tag register input terminal 2507, and a second tag comparison input terminal 2508. One instruction is temporarily held in each one not-yet-issued instruction entry.

In order to determine whether or not a given instruction is issuable, it is necessary to investigate whether or not all operands required by the given instruction are complete. In the prior art multiple instruction parallel issue management unit, whether or not all necessary input operands are complete, is discriminated by a parallel comparison using the comparators 25015 and 25016, as will be described below. Here, in the shown example, it is assumed that two input operands are used for one instruction.

In the instruction tag field 25011 of the not-yet-issued instruction entry 2501, an instruction tag inherent to the given instruction is stored. If input operands exist, the input operands are stored in the first operand/tag field 25013 and the second operand/tag field 25014, a comparator 25015, and another comparator 25016. If the input operands have not yet existed, instruction tags of instructions resultantly generating the input operands are stored in the first operand/tag field 25013 and the second operand/tag field 25014.

If execution of an instruction is completed, the instruction tag of the same instruction is supplied through the first tag comparison input terminal 2506 and the second tag comparison input terminal 2508 to the comparator 25015 and the comparator 25016 of all the not-yet-issued instruction entries 2501, respectively. These comparators 25015 and 25016 compare the input instruction tag with the values (the input operand or the instruction tag) stored in the first operand/tag field 25013 and the second operand/tag field 25014, respectively, in order to check whether or not both are consistent. Here, it is so set that the input operand and the instruction tag are never consistent.

If the result of comparison indicates consistency, since the result value of the instruction obtained by the completion of the execution of the instruction is supplied through the first operand/tag register input terminal 2505 and the second operand/tag register input terminal 2507, the result value is registered in the first operand/tag field 25013 or the second operand/tag field 25014. On the other hand, the issue control unit 2502 receives the result of comparison from the comparators 25015 and 25016, and discriminates whether or not all operands required by the respective instruction are complete.

As mentioned above, the multiple instruction parallel issue management unit of the prior art superscalar microprocessor discriminates whether or not the instruction is issuable, by the parallel comparison using the comparators 25015 and 25016. Incidentally, in the example shown in FIG. 30, one comparator 25015 and one comparator 25016 are provided for each one not-yet-issued instruction entry, but actually, for each one entry there are required the comparators of the number of instructions simultaneously executed in parallel.

On the other hand, the multiple instruction parallel execution management unit is constructions as follows: In order to ensure the order of instructions when the instructions are executed in the order different from the instruction fetch/decode order, the multiple instruction parallel execution management unit temporarily holds the result value of the instruction which has been executed but whose execution result has not yet been decided (called a "not-yet-decided result value" hereinafter), and supplies these not-yet-decided result values to the not-yet-issued instructions as an input operand.

Referring to FIG. 31, there is shown a block diagram illustrating a fundamental construction of the prior art multiple instruction parallel execution management unit. The shown multiple instruction parallel execution management unit includes a plurality of executed instruction entries 2601 and an execution control unit 2602. Each of the executed instruction entries 2601 includes a result value field 26011, an instruction tag field 26012, a register number field 26013, and three comparators 26014, 26015 and 26016. The shown multiple instruction parallel execution management unit further includes a result value input terminal 2603, an instruction tag registration input terminal 2604, an in instruction tag comparison input terminal 2605, a register number registration input terminal 2606, a first input terminal 26071 for register number comparison, and a second input terminal 26072 for register number comparison, a first operand/tag output terminal 26081, a second operand/tag output terminal 26082, a result value output terminal 26091 and a register number output terminal 26092. For each one executed instruction entry 2601, a not-yet-decided result value of one executed instruction is temporarily stored.

When an instruction requires an input operand for a register file, the multiple instruction parallel execution management unit investigates whether or not the required input operand is temporarily stored within the multiple instruction parallel execution management unit as a not-yet-decided result value with having not yet been written into the register file, and supplies the not-yet-decided result value as the input operand for the instruction if necessary. This operation is realized in the prior art multiple instruction parallel execution management unit by a parallel comparison using the comparators 26015 and 26016, as will be described below:

In the result value field 26011 of the executed instruction entry 2601, the not-yet-decided result value is stored, and the instruction tag is stored in the instruction field 26012. In the register number field 26013, the register number to be written is stored. When an instruction requires two input operands, the register numbers from which the required two input operands are to be read out, are respectively supplied through the register number comparison first input terminal 26071 and the register number comparison second input terminal 26072 to the comparators 26015 and 26016 of all the entries. Each of these comparators 26015 and 26016 compares a corresponding input register number with the register number stored in the register number field 26013.

For all the entries, the execution control unit 2602 investigates whether or not the register number consistency is detected as the result of the comparison. If a plurality of consistency results are obtained for one input operand, it is discriminated that the register number consistency is detected in the entry storing the newest instruction. From the executed instruction entry 2601 which is discriminated to be consistent with the respective input operand, the result value and the instruction tag are read out and outputted through the first operand/tag output terminal 26081 and the second operand/tag output terminal 26082.

When execution of an instruction has been completed, the comparator 26014 is used for determining into which of the executed instruction entry 2601 the not-yet-decided result value of the executed instruction is stored. The determination is conducted by comparing the instruction tag of the executed instruction with the instruction tag previously stored in the instruction tag field 26012 of each entry by use of the comparator 26014 in parallel, in order to investigate the executed instruction entry consistent with the instruction tag of the executed instruction. In addition, when the execution of an instruction is decided, the result value and the register number of that instruction are outputted from the multiple instruction parallel execution management unit through the result output terminal 26091 and the register number output terminal 26092 to the register file.

As mentioned above, the multiple instruction parallel execution management unit of the prior art superscalar microprocessor discriminates whether or not the not-yet-decided result value is supplied as the input operand for the not-yet-issued instruction, by a parallel comparison using the comparators 26015 and 20016 of all the executed instruction entries. Incidentally, in the shown example, one comparator 26014, one comparator 26015 and one comparator 26016 are provided for each one executed instruction entry. However, for each one executed instruction entry, there are required the comparators 26014 of the number corresponding to the number of instructions, executions of which are simultaneously completed, and also there are required the comparators 26015 and 26016 of the number corresponding to the number of instructions which are simultaneously decoded.

As mentioned above, the microprocessor based on the prior art superscalar technology, requires a large number of comparators in each of the multiple instruction parallel issue management unit and the multiple instruction parallel execution management unit, for the purpose of the parallel decoding, the parallel issuing and the parallel execution of a plurality of instructions.

For example, consider a microprocessor using the prior art superscalar based on the prior art superscalar technology and constructed to issue three instructions in parallel and to execute and complete the three instructions in parallel. The microprocessor having the comparators of the number required in this scale, is actually manufactured and used, although the design is considerably complicated. In this case, the number of the not-yet-issued instruction entries 2501 in the multiple instruction parallel issue management unit is required to be at least 8, and the number of the executed instruction entries 2601 in the multiple instruction parallel execution management unit, is required to be at least 16. Therefore, the number of required comparators is 48 (=2×8×3) in the multiple instruction parallel issue management unit, and 144 (=3×16×3) in the multiple instruction parallel execution management unit.

Furthermore, consider a microprocessor using the prior art superscalar based on the prior art superscalar technology and constructed to issue nine instructions (which are three times the number of instructions processed in the above example) in parallel and to execute and complete the nine instructions in parallel. In this case, in proportion to the number of instructions issued and executed in parallel, it is necessary to increase the number of the not-yet-issued instruction entries 2501 in the multiple instruction parallel issue management unit and the number of the executed instruction entries 2601. For example, the number of the not-yet-issued instruction entries 2501 is required to be at least 24, and the number of the executed instruction entries 2601 is required to be at least 48. Therefore, the total number of required comparators is 432 (=2×24×9) in the multiple instruction parallel issue management unit, and 1296 (=3×48×9) in the multiple instruction parallel execution management unit.

As seen from the above, the number of the comparators in the multiple instruction parallel issue management unit and the multiple instruction parallel execution management unit has the nature of increasing abruptly substantially in proportion to a square of the number of instructions which are, in parallel, issued, executed and complete in execution. Incidentally, the number of instructions issued in parallel, the number of instructions executed in parallel and the number of instructions completed in execution in parallel, are set to be same or the substantially the same.

As described above, the microprocessor based on the prior art superscalar technology, requires a large number of comparators in each of the multiple instruction parallel issue management unit and the multiple instruction parallel execution management unit, in order to decode a plurality of instructions in parallel, to issue a plurality of instructions in parallel, and to execute a plurality of instructions in parallel. Because of this large number of comparators and the control circuits therefor, the multiple instruction parallel issue management unit and the multiple instruction parallel execution management unit in the microprocessor based on the prior art superscalar technology, are not only extremely complicated in construction but also large in circuit scale.

In addition, since a large amount of comparing operations are executed simultaneously in parallel, a large amount of electric power is consumed.

Furthermore, since the number of the comparators in the multiple instruction parallel issue management unit and the multiple instruction parallel execution management unit has the nature of increasing abruptly substantially in proportion to a square of the number of instructions which are, in parallel, issued, executed and complete in execution, if attempt is made to elevate the degree of parallelism in processing, the degree of complication in the control circuits and in wiring also abruptly increases with increase of the number of the comparators, and the delay time correspondingly increases. These problems are a serious problem in improving the architecture of the microprocessor using the superscalar technology, and in elevating the degree of parallelism in processing.

Elevation of the degree of parallelism in processing is the most important factor in increasing the processing performance of the microprocessor using the superscalar technology. However, because of the above mentioned reason, it was difficult to manufacture a processor capable of executing ten or more instructions in parallel.

SUMMARY OF THE INVENTION

Accordingly, it is an object of the present invention to provide a multiple instruction parallel issue management unit and a multiple instruction parallel execution management unit, which has overcome the above mentioned defects of the conventional ones.

Another object of the present invention is to provide a multiple instruction parallel issue management unit and a multiple instruction parallel execution management unit, which are constructed with no comparator, and therefore, which are simple in circuit construction, small in circuit scale, and also small in electric power consumption.

Still another object of the present invention is to provide a multiple instruction parallel issue/execution management unit capable of simultaneously decoding, issuing and executing ten or more instructions in parallel.

The above and other objects of the present invention are achieved in accordance with the present invention by a multiple instruction parallel issue/execution management system incorporated in a superscalar type processor configured to dynamically issue and execute a plurality of instructions in parallel, the system including a forward map buffer storing forward map information indicating whether or not a result value generated by execution of a given instruction is used as an input operand in other instructions, the forward map information being stored in a predetermined field of an instruction format, the forward map buffer previously storing the forward map information for the result value, before the result value corresponding to the given instruction is actually generated, so that when the result value corresponding to the given instruction is actually generated, an operand using the result value is specified by using the previously stored forward map information corresponding to the result value, and supplied to an instruction using the result value as the input operand.

The above and other objects, features and advantages of the present invention will be apparent from the following description of preferred embodiments of the invention with reference to the accompanying drawings.

BRIEF DESCRIPTION OF THE DRAWINGS

FIGS. 3A, 3B and 3C illustrate three instruction formats used in the first embodiment of the present invention;

FIGS. 4A and 4B illustrate a relation between a unidirectional relative input operand number and a relative instruction number, used in the first embodiment of the present invention;

FIGS. 5A and 5B illustrate a relation between a bidirectional relative input operand number and a relative instruction number, used in the first embodiment of the present invention;

FIG. 8 shows abbreviations indicated by the values stored in the issue flags used in the first embodiment of the present invention, and corresponding meanings;

FIG. 9 shows abbreviations indicated by the values stored in the execution flags used in the first embodiment of the present invention, and corresponding meanings;

FIG. 13 illustrate examples of instruction code strings used in the multiple instruction parallel issue/execution management unit in accordance with the first embodiment of the present invention;

FIG. 14 illustrates the values of registers in the register file used in the multiple instruction parallel issue/execution management unit in accordance with the first embodiment of the present invention;

Figure 16:
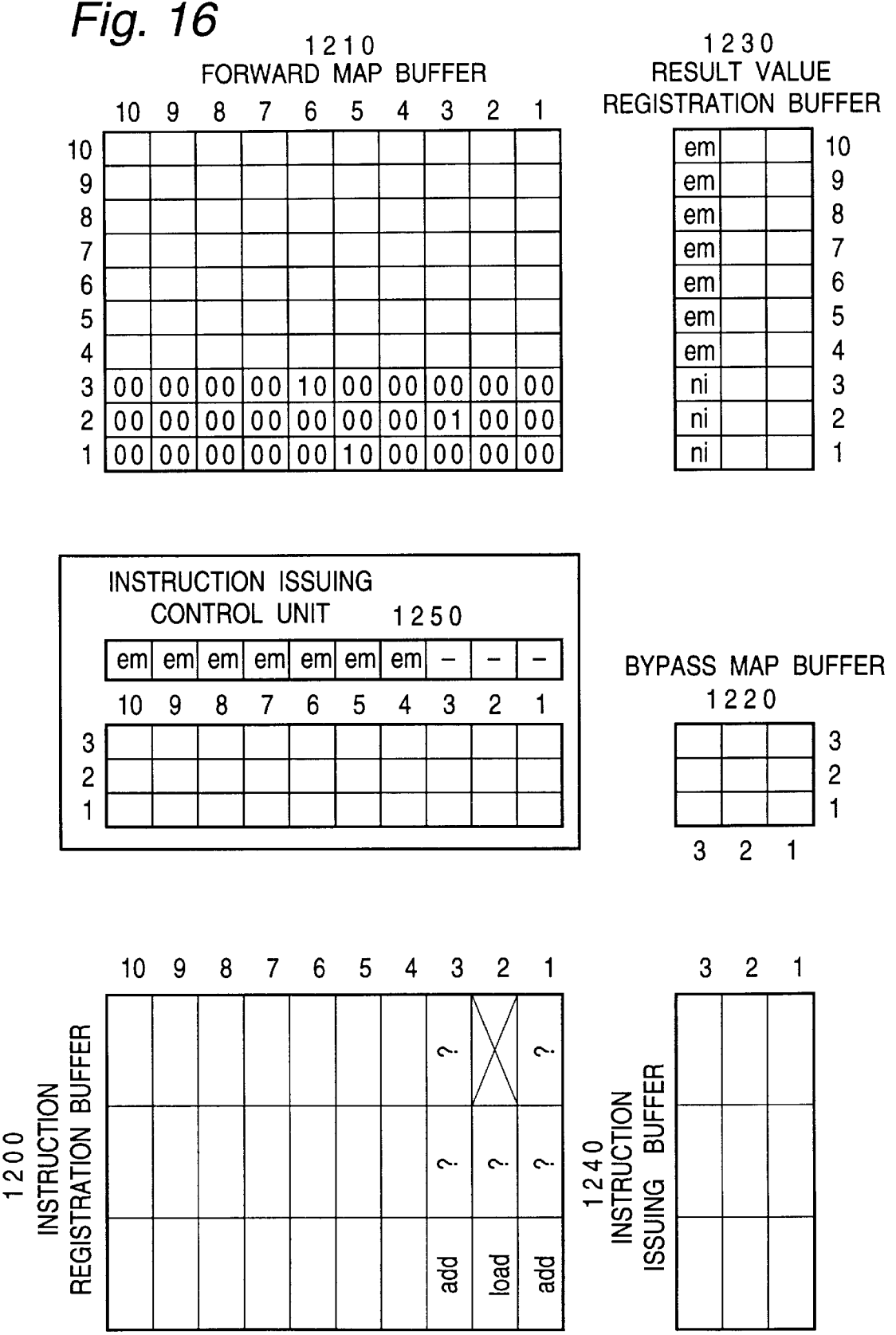
Figure 24:
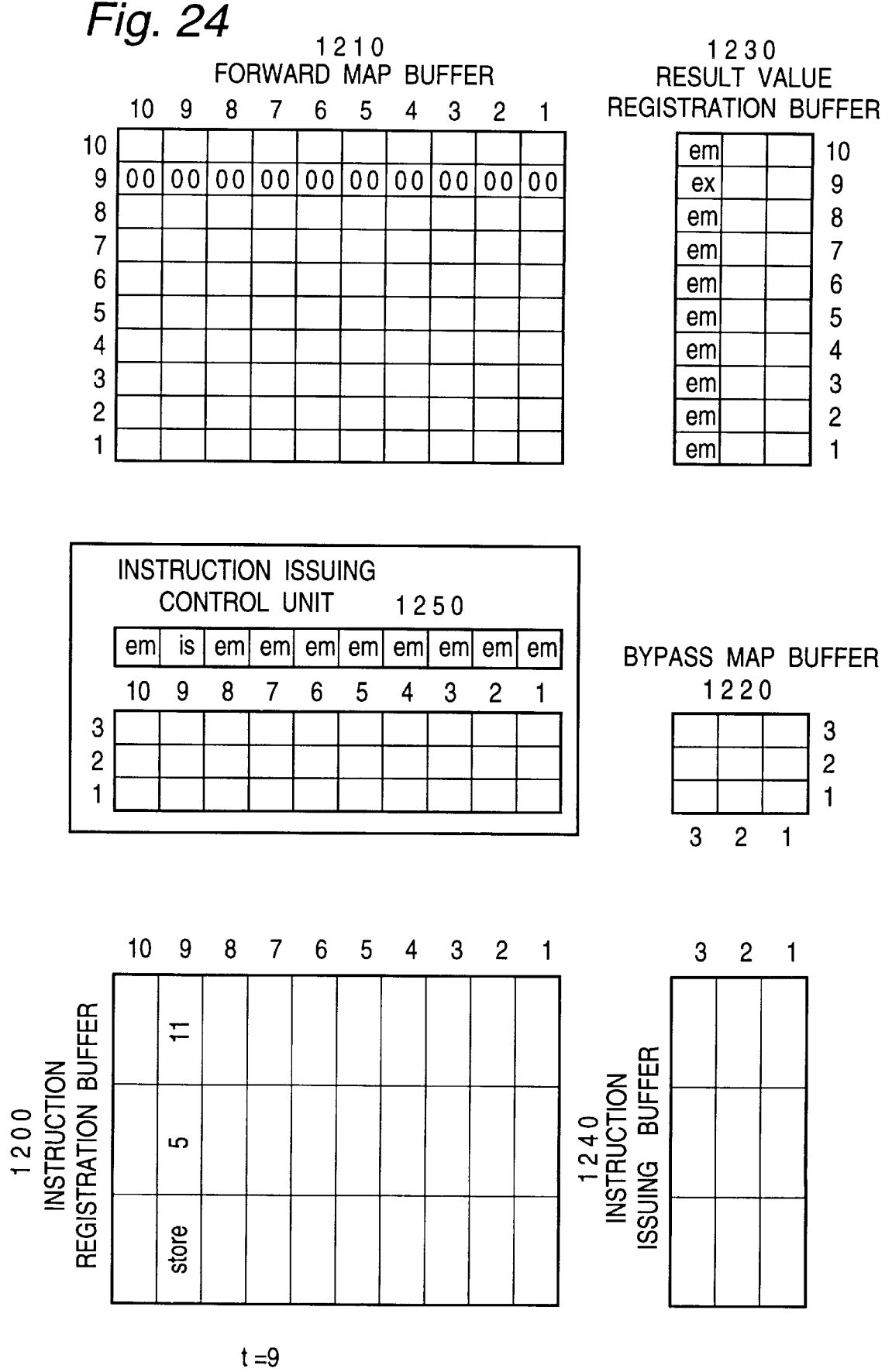
Figure 25:
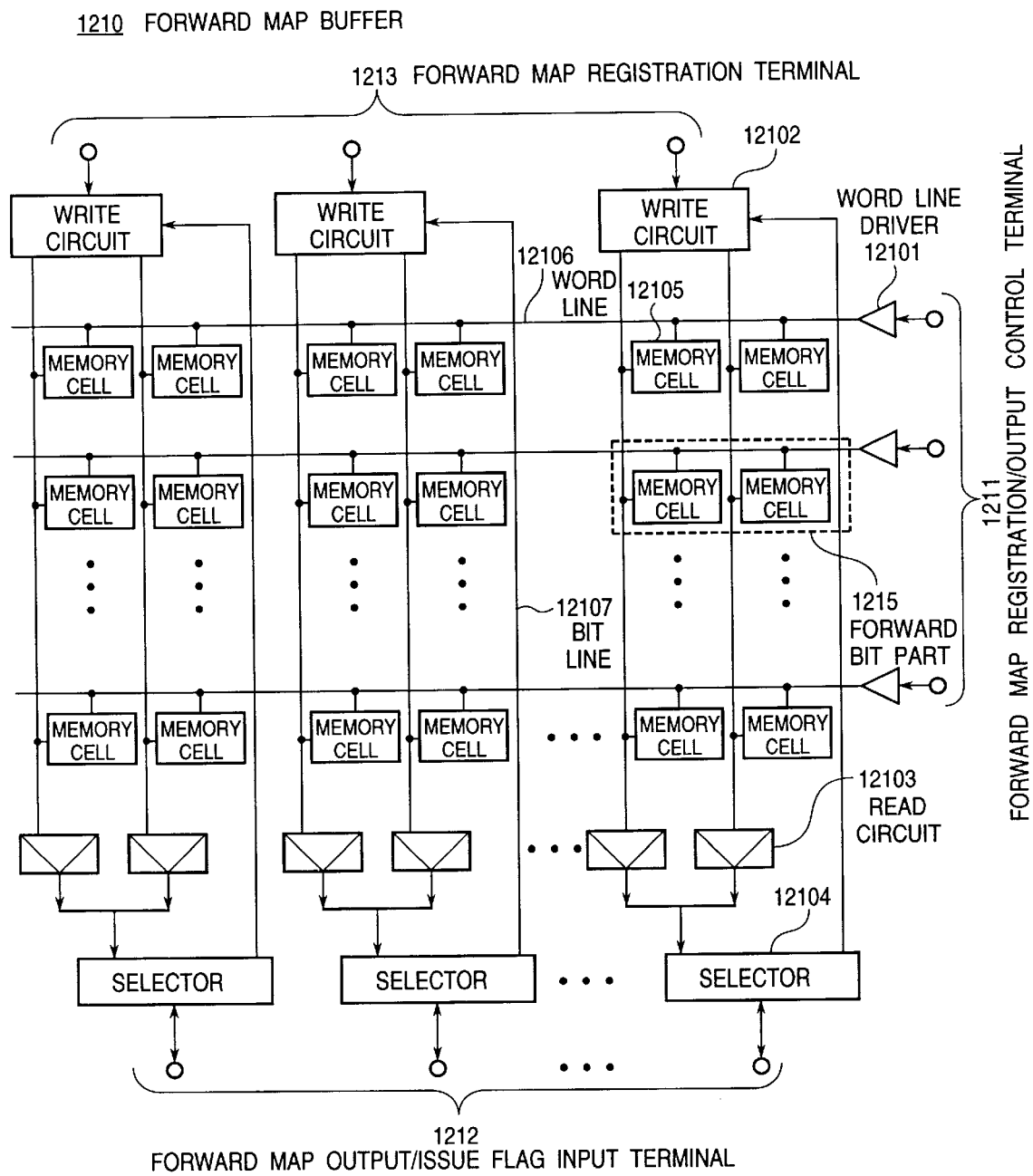
Figure 26:
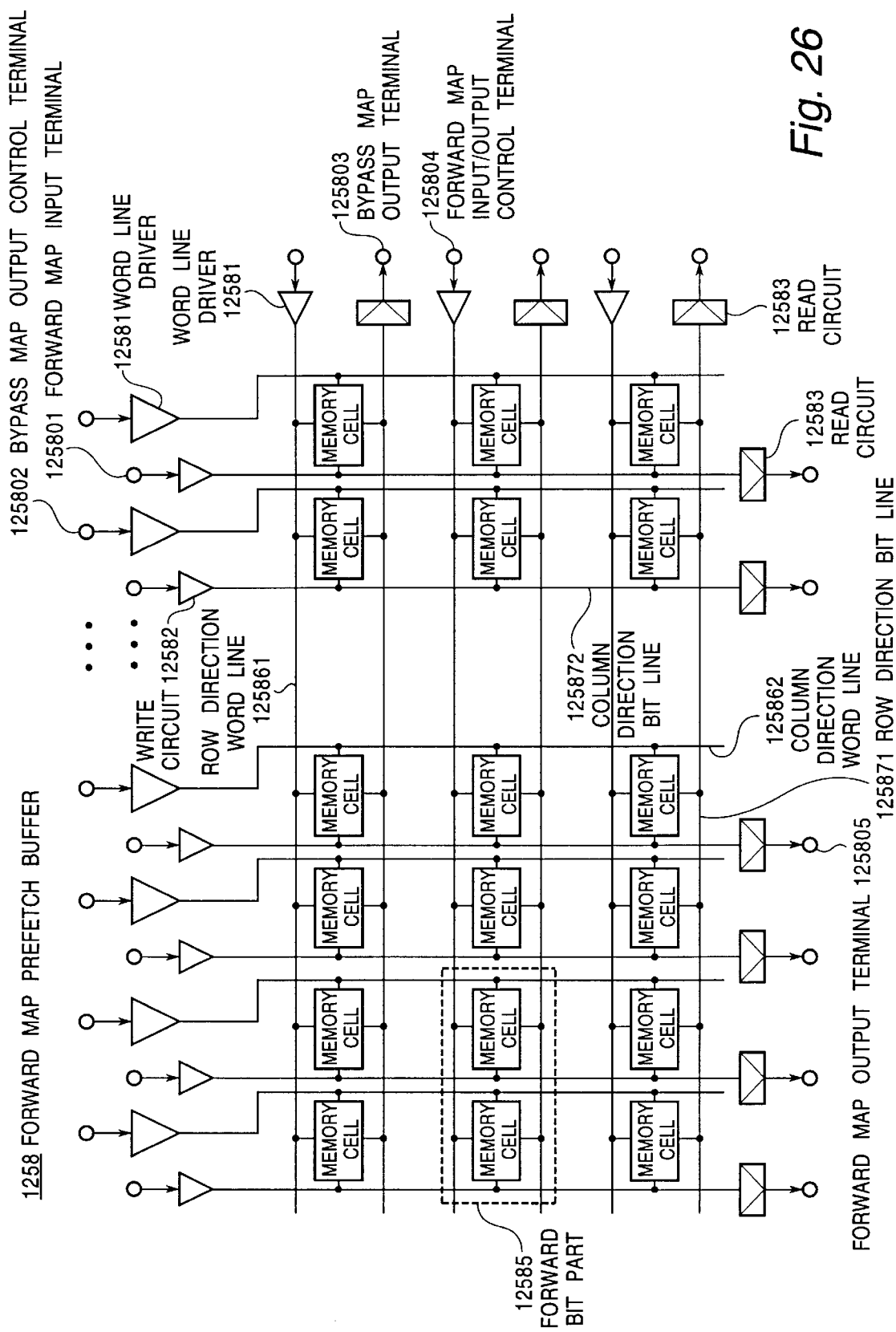
Figure 27:
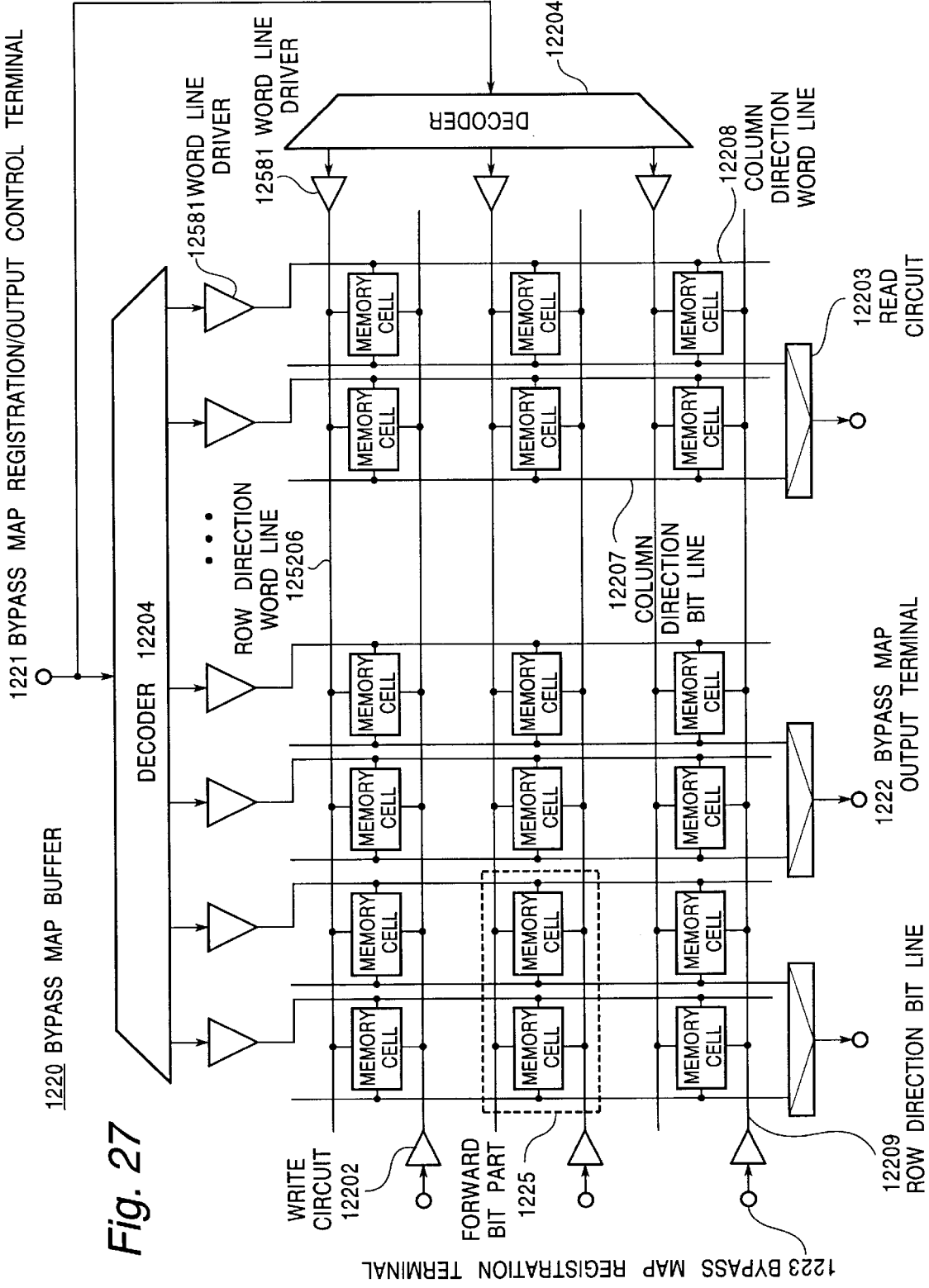
Figure 28:
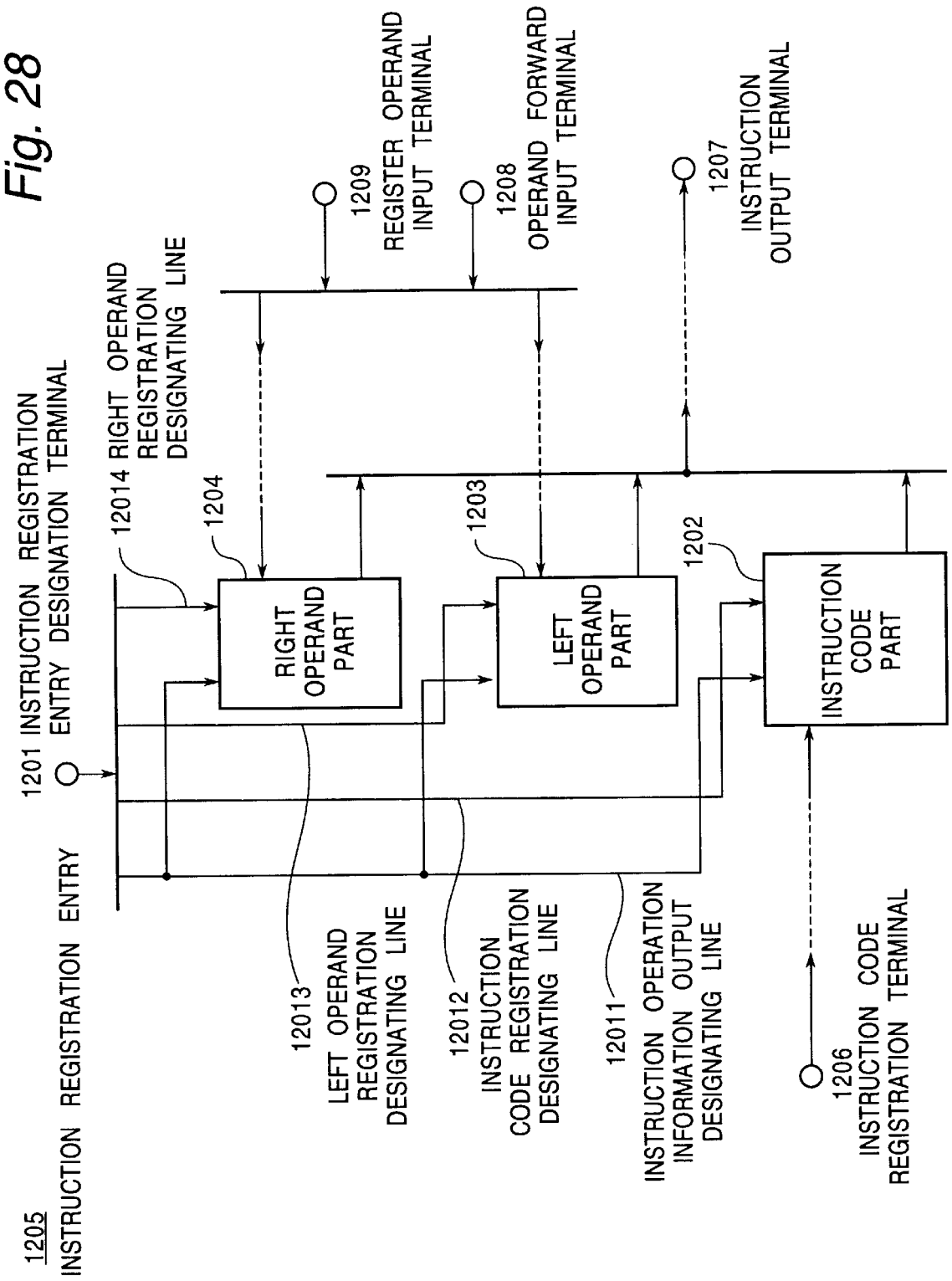
Figure 29:
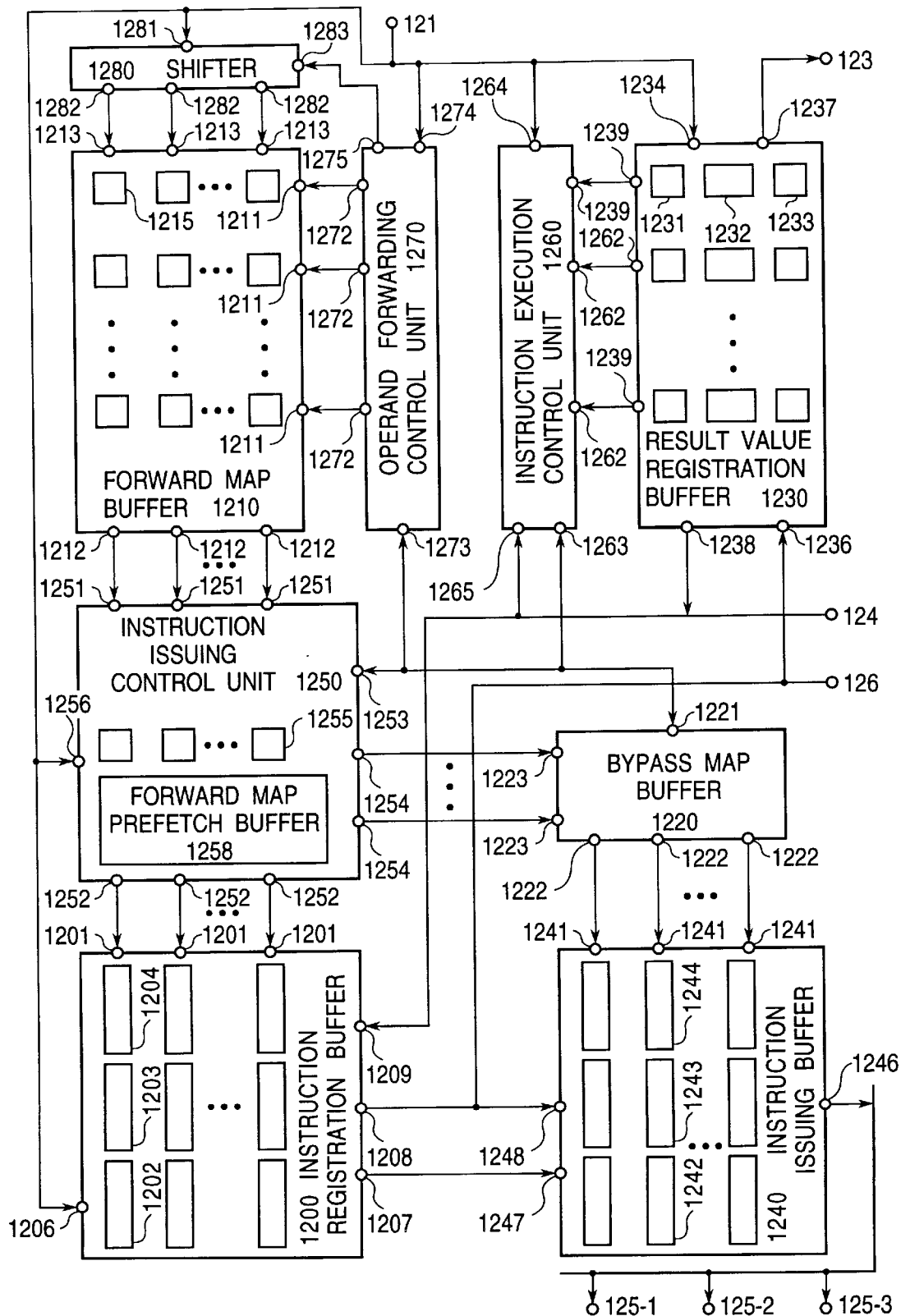
Figure 30:
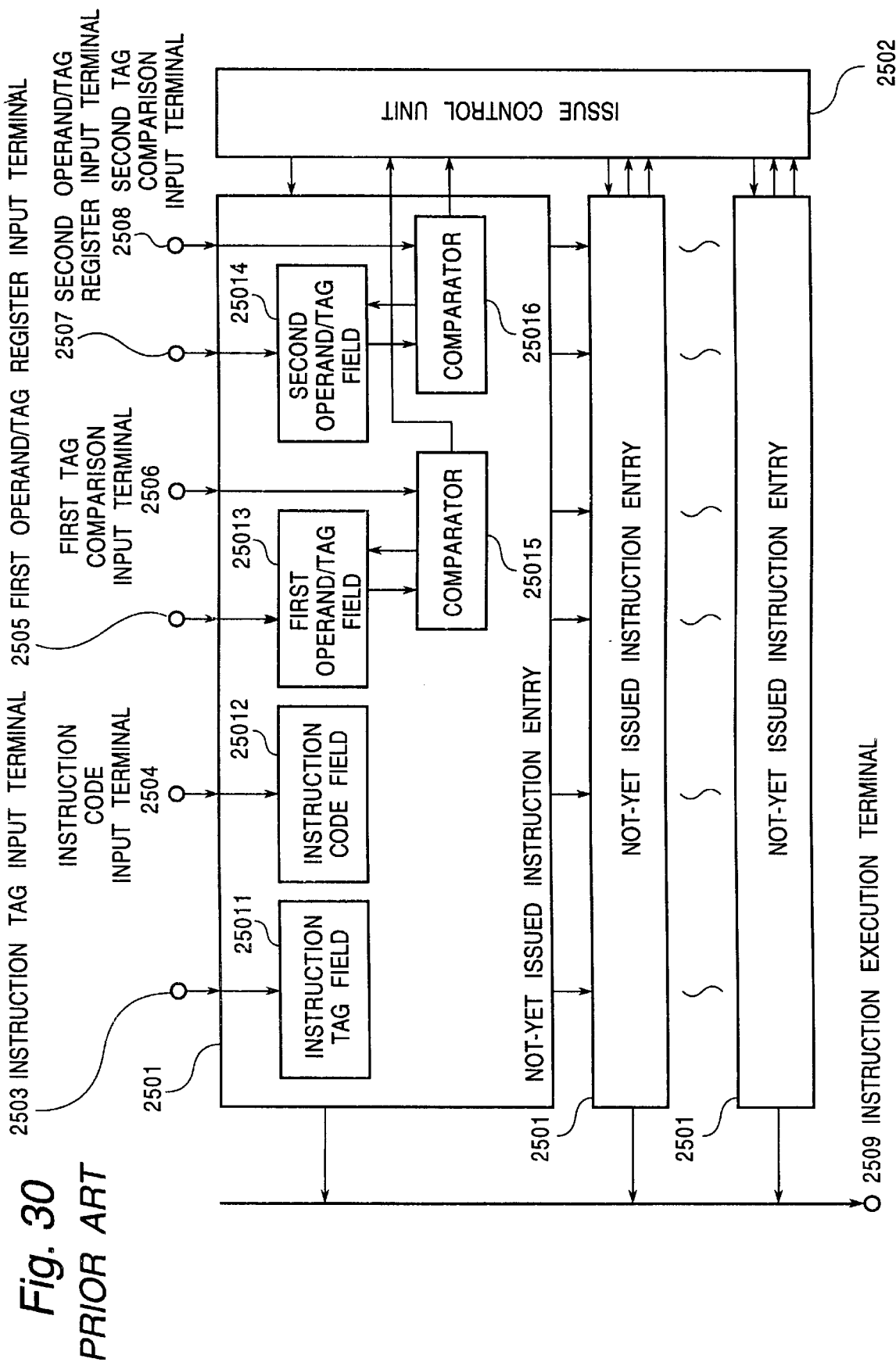
Figure 31:
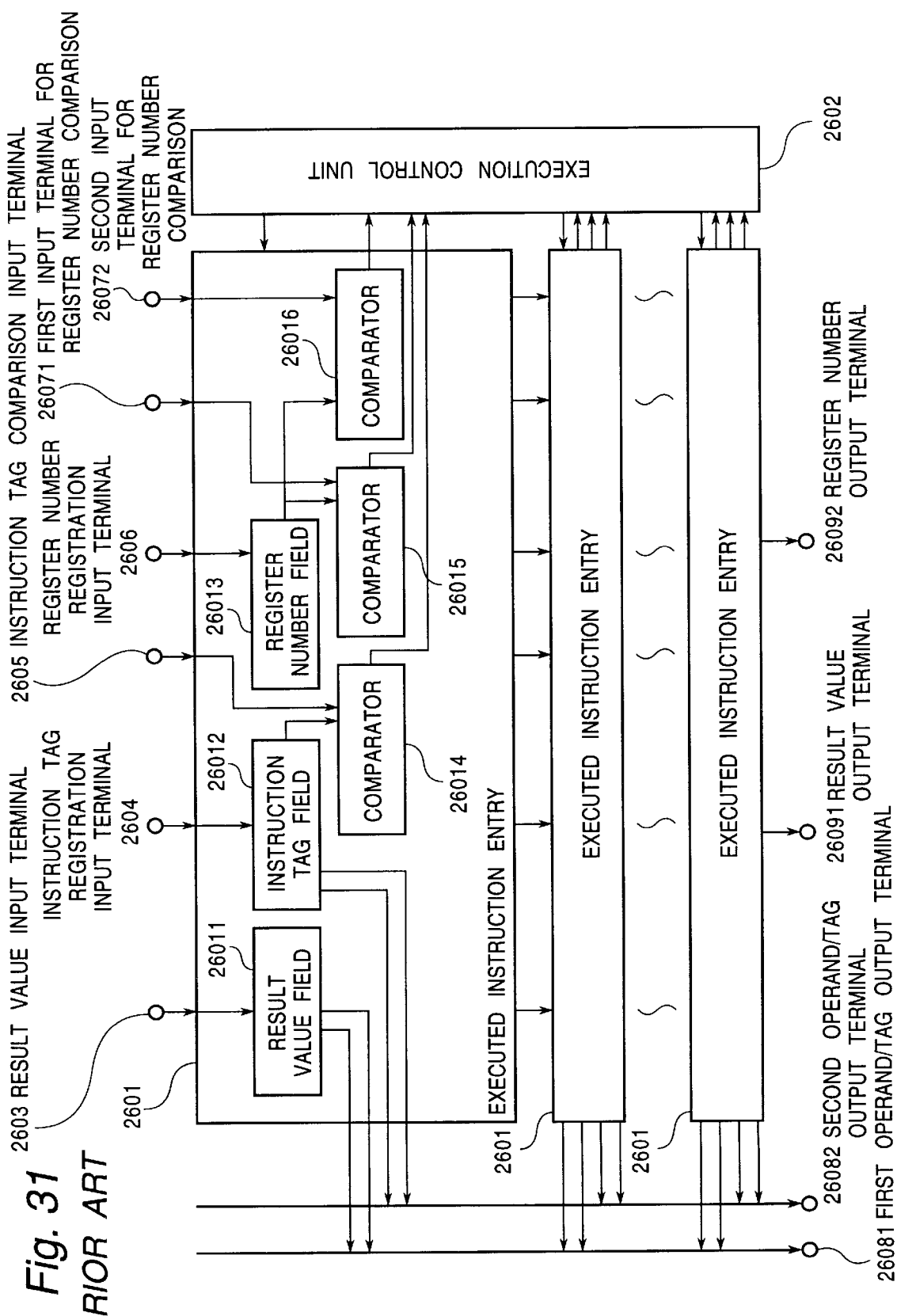

as FIG. 15 illustrates the pipeline operation timing in the processor in the case of the instruction code string shown in FIG. 13;

FIG. 16 illustrates the operation of the multiple instruction parallel issue/execution management unit in accordance with the first embodiment of the present invention, in the case of t=1;

FIG. 17 illustrates the operation of the multiple instruction parallel issue/execution management unit in accordance with the first embodiment of the present invention, in the case of t=2;

FIG. 18 illustrates the operation of the multiple instruction parallel issue/execution management unit in accordance with the first embodiment of the present invention, in the case of t=3;

FIG. 19 illustrates the operation of the multiple instruction parallel issue/execution management unit in accordance with the first embodiment of the present invention, in the case of t=4;

FIG. 20 illustrates the operation of the multiple instruction parallel issue/execution management unit in accordance with the first embodiment of the present invention, in the case of t=5;

FIG. 21 illustrates the operation of the multiple instruction parallel issue/execution management unit in accordance with the first embodiment of the present invention, in the case of t=6;

FIG. 22 illustrates the operation of the multiple instruction parallel issue/execution management unit in accordance with the first embodiment of the present invention, in the case of t=7;

FIG. 23 illustrates the operation of the multiple instruction parallel issue/execution management unit in accordance with the first embodiment of the present invention, in the case of t=8;

FIG. 24 illustrates the operation of the multiple instruction parallel issue/execution management unit in accordance with the first embodiment of the present invention, in the case of t=9;

FIG. 25 illustrates an example of the forward map buffer in the multiple instruction parallel issue/execution management unit in accordance with the first embodiment of the present invention;

FIG. 26 illustrates an example of the forward map prefetch buffer in the multiple instruction parallel issue/execution management unit in accordance with the first embodiment of the present invention;

FIG. 27 illustrates an example of the bypass map buffer in the multiple instruction parallel issue/execution management unit in accordance with the first embodiment of the present invention;

FIG. 28 illustrates the construction of the instruction registration entry in the instruction registration buffer in the multiple instruction parallel issue/execution management unit in accordance with the first embodiment of the present invention;

FIG. 29 is a block diagram of the multiple instruction parallel issue/execution management unit in accordance with a second embodiment of the present invention;

FIG. 30 is a block diagram illustrating a fundamental construction of the prior art multiple instruction parallel issue/execution management unit; and FIG. 31, there is shown a block diagram illustrating a fundamental construction of the prior art multiple instruction parallel execution management unit.

DESCRIPTION OF THE PREFERRED EMBODIMENTS

Now, embodiments of the present invention will be described with reference to the drawings. In the following description, the multiple instruction parallel issue management unit and the multiple instruction parallel execution management unit will be considered as a whole as one unit, which will be called a "multiple instruction parallel issue/execution management unit".

Figure 1:
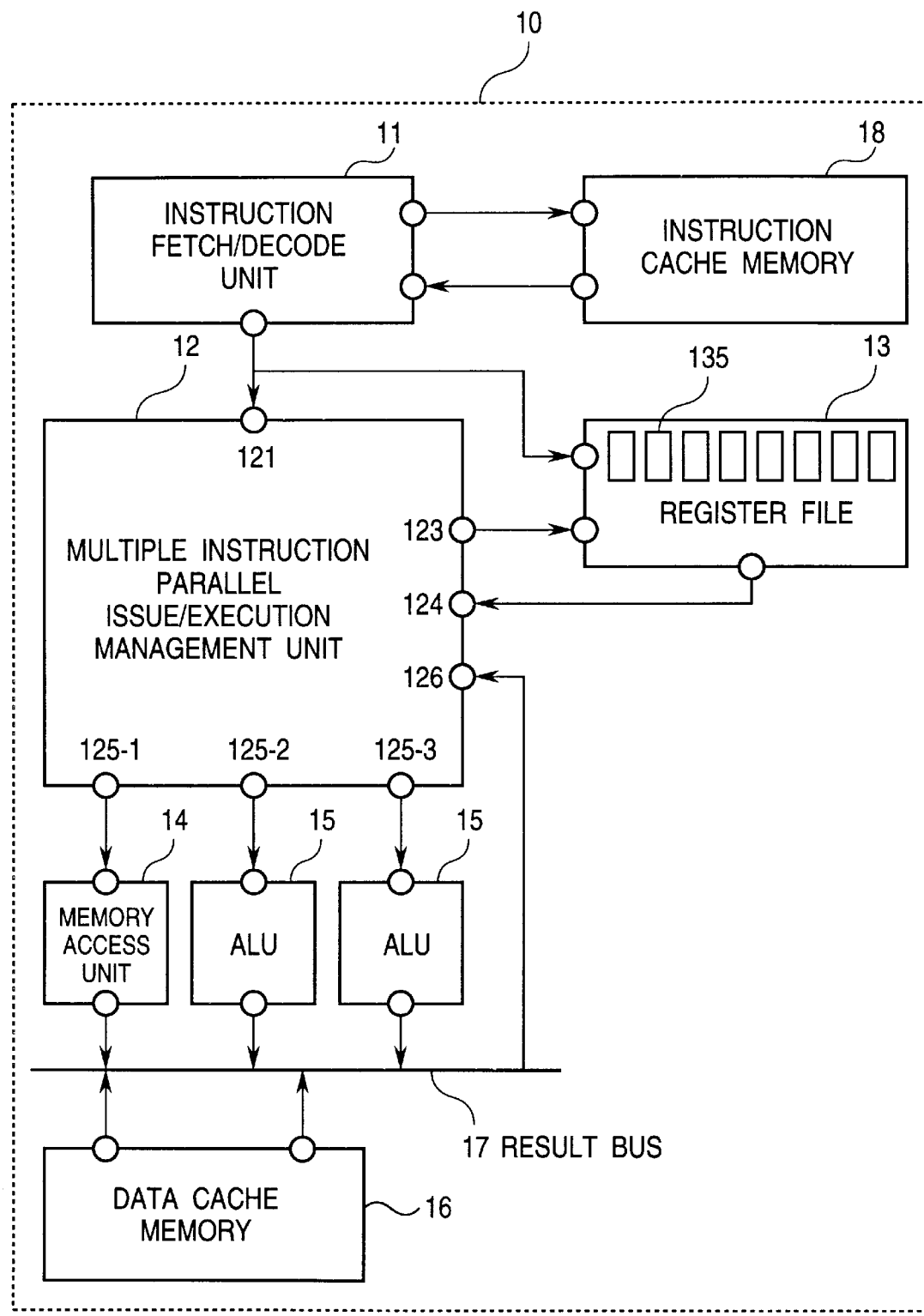
FIG. 1 is a block diagram of an overall structure of the processor in accordance with a first embodiment of the present invention.

Referring to FIG. 1, there is shown a block diagram of an overall structure of the processor in accordance with a first embodiment of the present invention.

The shown processor is designated with Reference Numeral 10, and comprises an instruction fetch/decode unit 11, an instruction cache memory 18, a multiple instruction parallel issue/execution management unit 12, a register file 13, a memory access unit 14, arithmetic and logic units (ALU) 15, a data cache memory 16 and a result bus 17, which are coupled as shown.

Although one memory access unit 14 and two arithmetic and logic units 15 are shown, an arbitrary number of memory access units and an arbitrary number of arithmetic and logic units can be provided. In addition, when a plurality of arithmetic_and logic units 15 are provided, it is possible to adopt such a construction that the plurality of arithmetic and logic units 15 has different internal constructions to perform different operations. In the shown embodiment, one memory access unit 14 and two arithmetic and logic units 15 are provided to be able to execute three instructions at maximum in parallel. In addition, the instruction cache memory 18 and the data cache memory 16 are not indispensable, and therefore, the processor 10 can be coupled to access directly to an external memory. The register file 13 internally includes a plurality of registers 135. In the shown embodiment, the register file 13 internally includes eight registers 135.

The multiple instruction parallel issue/execution management unit 12 includes a decode information input terminal 121, a register file writing terminal 123, a register file reading data terminal 124, three instruction issuing terminals 125-1, 125-2 and 125-3, and a result input terminal 126, as shown.

In the processor 10 shown in FIG. 1, the instruction cache memory 18 stores a strings of instructions arranged in the order of instruction addresses. The processor 10 executes the instruction string in the order of instruction addresses, except for the situation that a branch is executed for a branch instruction. When the branch is executed for the branch instruction, the processor processes an instruction string starting a branch destination address designated by the branch instruction. In the following, the predetermined processing order of the instruction string as mentioned above will be called a "program sequence".

The instruction fetch/decode unit 11 simultaneously fetches a plurality of instructions arranged in the instruction address order, from the instruction cache memory 18. The instruction fetch/decode unit 11 decodes the plurality of instructions to designate the kind of the operation and the registers 135 in which the reading/writing is performed. For simplification of the description, it is assumed that one instruction executes to write the result value into one register 135 at maximum within the register file 13, and similarly, one instruction executes to read input operands from two registers 135 at maximum within the register file 13. In the shown embodiment, the instruction fetch/decode unit 11 can decode three instructions at maximum in parallel.

As regards the three decoded instructions, the instruction fetch/decode unit 11 transfers a decoded instruction code (called an "instruction code information"), information of the register 135 to be written (called a "register write information"), and forward map information, through the decode information input terminal 121 to the multiple instruction parallel issue/execution management unit 12. Information concerning the instructions supplied from the instruction fetch/decode unit 11 to the multiple instruction parallel issue/execution management unit 12 and held in the multiple instruction parallel issue/execution management unit 12, will be called an "instruction operation information". In addition, the instruction fetch/decode unit 11 supplies the register write information and a register read information (information of the register 135 to be read out), to the register file 13. The forward map information will be described later.

The multiple instruction parallel issue/execution management unit 12 temporarily stores in the instruction operation information concerning the plurality of instructions transferred through the decode information input terminal 121 from the instruction fetch/decode unit 11. Here, the instruction which is stored in the multiple instruction parallel issue/execution management unit 12 and which has not yet been issued to the memory access unit 14 or the arithmetic and logic unit 15, is called a "not-yet-issued instruction". The multiple instruction parallel issue/execution management unit 12, selects from the not-yet-issued instructions, a plurality of instructions which are issuable because necessary input operands are already complete, and then, simultaneously issues the selected plurality of instructions through the instruction issue terminals 125 to the memory access unit 14 and the arithmetic and logic units 15. In this embodiment, the multiple instruction parallel issue/execution management unit 12 can simultaneously issue three instructions at maximum.

Here, the memory access unit 14 is used in a load/store instruction or when any instruction using a variable in the memory as an input value/output value is executed. The memory access unit 14 access the data cache memory 16. The arithmetic and logic units 15 processes an arithmetic and long operation and a branch instruction. The memory access unit 14 and the arithmetic and logic units 15 output the result value (which are the result of the processing of a given instructions) to the result bus 17.

The multiple instruction parallel issue/execution management unit 12 internally holds not only the instruction operation information concerning the not-yet-issued instructions, but also the instruction operation information concerning the instructions each of which has already been issued but is under execution (called an "under-execution instruction) and the instructions each of which has been already executed but has not yet been decided (called a "not-yet-decided instruction). In other words, the multiple instruction parallel issue/execution management unit 12 internally holds the information of all instructions which have already been decoded but for which the result value has not been decided.

The multiple instruction parallel issue/execution management unit 12 receives through the result value input terminal 126 the result values of three executed instructions at maximum supplied through the result bus 17, and internally temporarily holds the result values until the result values have been decided. If the result values have been decided, the multiple instruction parallel issue/execution management unit 12 writes these result values through the register file write terminal 123 to the register file 13. The result value in a not-yet-decided condition is called a "not-yet-decided result value". The not-yet-decided result value is not written into the register 13 and is held in the multiple instruction parallel issue/execution management unit 12.

In the processor 10, issuing and execution of instructions are performed after all necessary operands are complete.

Therefore, there may be a case that the instructions are issued and executed in the order different from the program order of the instructions. When the instructions have been executed in the order different from the program order, it is said that the execution and the result value of the instruction have not yet been decided. In other words, the fact that a given instruction has been decided or the result value of a given instruction has been decided, means that the execution of the given instruction is completed, and the execution of all instructions to be executed before the given instruction in the program sequence has been completed, so that the execution and the result value of the given instruction can no longer be revoked for various reasons including an interrupt, an exception and an branch prediction failure.

When a given instruction designates the register 135 in the register file 13 as an input operand, the multiple instruction parallel issue/execution management unit 12 receives the data read out from the designated register 135, through the register file reading data terminal 124. In addition, for any instruction, the multiple instruction parallel issue/execution management unit 12 selects a plurality of not-yet-issued instructions requiring the result value of the instruction, in accordance with the forward map information which will be described later, and executes an operation of forwarding the result value to the plurality of not-yet-issued instructions. The multiple instruction parallel issue/execution management unit 12 investigates whether or not all necessary input operands for each instruction will be complete, by reading from the register file 13 and forwarding the not-yet-decided result value, and determines that the instruction, all necessary input operands for which will be complete, is issuable.

In the shown embodiment, in each instruction there is previously designated an input operand using the result value of the instruction. The designation of the input operand is realized by having the forward map information in the inside of each instruction generating the result value. The multiple instruction parallel issue/execution management unit 12 shown in FIG. 1 manages the multiple instruction parallel issue/execution management on the basis of this forward map information.

Figure 2A:
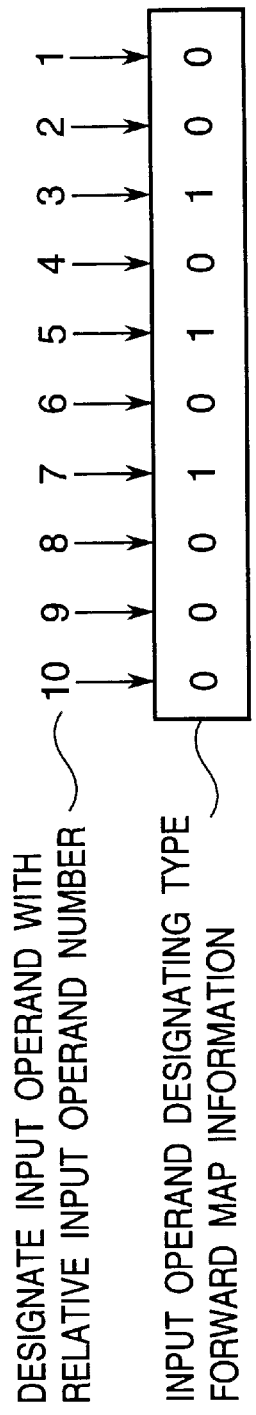
FIGS. 2A and 2B illustrate two examples of forward map information used in the first embodiment of the present invention.
Figure 2B:
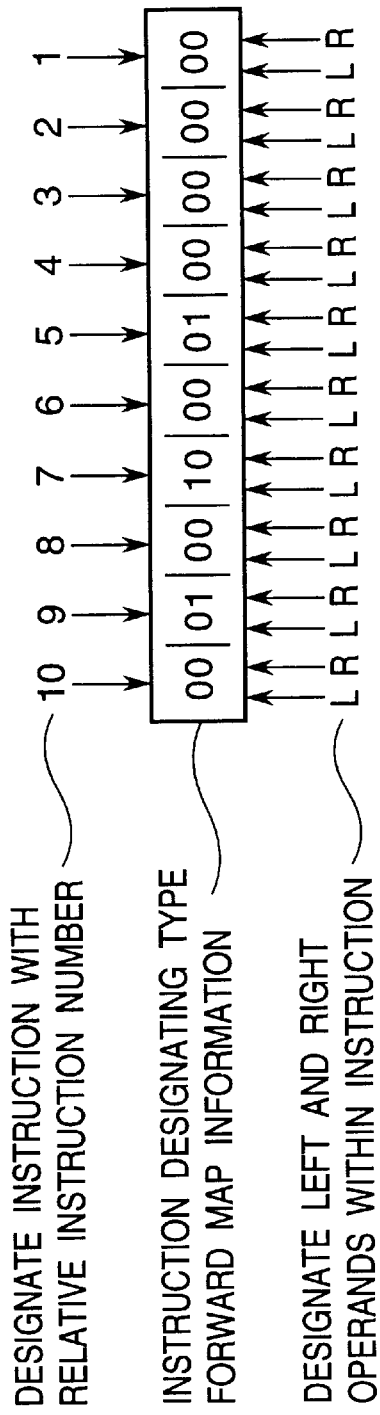

FIGS. 2A and 2B illustrate two examples of the forward map information. Here, the forward map information is information indicating which of succeeding instructions uses the result value of an instruction as an input operand. An example of the forward map information shown in FIG. 2A is called an "input operand designating type", and an example of the forward map information shown in FIG. 2B is called an "instruction designating type".

The input operand designating type forward map information shown in FIG. 2A is constituted by arranging "D" items of one-bit information. Here, "D" is an arbitrary positive integer, and indicates the maximum number of the input operands for which the forward map information can be designated. In the shown example, D=10, and when the value of a (d)tb bit counted from a rightmost bit in the forward map information is "1", it indicates that an input operand of a relative input operand number "d" viewed from the instruction designating the forward map information, uses the result value of the same instruction. To the contrary, when the value of the (d)th bit counted from the rightmost bit in the forward map information is "0", it indicates that the input operand of the relative input operand number "d" viewed from the instruction designating the forward map information, does not use the result value of the same instruction. The relative input operand number will be described later.

The input operand designating type forward map information will be described with reference to FIG. 2A. In the example shown in FIG. 2A, the bits at the positions corresponding to the input operands of the relative input operand numbers "3", "5" and "7" are "1", and the other bits are "0". Accordingly, the forward map information indicates that the result value of the instruction containing the forward map information is used by the input operand of the relative input operand numbers "3", "5" and "7", but not used by the input operands of the other relative input operand numbers.

The instruction designating type forward map information shown in FIG. 2B is constituted by arranging "p×D" items of one-bit information. Here, "D" is an arbitrary positive integer, and indicates the maximum number of the input operands for which the forward map information can be designated. "p" is an arbitrary positive integer, and indicates the maximum number of the input operands which can be taken by the arbitrary instruction. In the shown example, D=10 and p=2, and when the value of a (p×d+q)th bit counted from a rightmost bit in the forward map information is "1", it indicates that a (q)th input operand in a relative input operand number "d" viewed from the instruction designating the forward map information, uses the result value of the same instruction. To the contrary, when the value of the (p×d+q)th bit counted from the rightmost bit in the forward map information is "0", it indicates that the (q)th input operand in the relative input operand number "d" viewed from the instruction designating the forward map information, does not use the result value of the same instruction. The relative instruction number will be described later.

The instruction designating type forward map information will be described with reference to FIG. 2B. In the example shown in FIG. 2B, the 2-bit forward map information corresponding to the respective instructions are partitioned by "1". In FIG. 2B, for simplification of explanation, two bits corresponding to each one instruction are distinguished from each other by giving character labels "L" and "R". This labeling corresponds to the fact that, since two input operands exist at maximum for each instruction, the two operands are called a "left input operand" and a "right input operand", respectively.

In the shown example, the bits at the positions corresponding to the input operands "R", "L" and "R" in the relative instruction numbers "5", "7" and "9" are "1", and the other bits are "0". Accordingly, the forward map information indicates that the result value of the instruction containing the forward map information is used by the right input operand, the left input operand and right input operand in the instruction of the relative instruction numbers "5", "7" and "9", but not used by the other input operands of the other instructions.

As mentioned above, the forward map information used in the present invention makes it possible to designate a plurality of input operands using the result value of the instruction concerned.

FIGS. 3A, 3B and 3C illustrate the instruction formats used in the present invention. As regards the arithmetic operation instruction and the memory access instruction, FIGS. 3A, 3B and 3C illustrate three instruction formats including the forward map information.

The instruction format shown in FIG. 3A includes the forward map information in addition to the fields which have existed in the prior art instruction format of the arithmetic operation instruction and the memory access instruction, and which designate an instruction code, a result value register, a left operand register and a right operand register, respectively. The instruction code field indicates the kind of the instruction to be executed, and the result value register indicates the register number of the register in which the result value is to be written (called a "result value register" hereinafter). The left operand register field indicates the register number of the register from which the left operand is to be read out (called a "left operand register" hereinafter), and the right operand register field indicates the register number of the register from which the right operand is to be read out (called a "right operand register" hereinafter). In the forward map information field, there is stored the above mentioned forward map information, namely, information concerning which of input operands of succeeding instructions uses the result value of the instruction concerned. This forward map information can be easily obtained by investigating, in instruction strings using the prior art instruction format, which of left and right input operands of which succeeding instructions uses the result value of the instruction concerned.

As mentioned above, the multiple instruction parallel issue/execution method in the first embodiment uses the forward map information to directly give the result value of some instruction to an input operand of other instructions. Therefore, by designating the forward map information, there exist many cases in which it is no longer necessary to designate the result value register and the left operand register or the right operand register. In these cases, the corresponding field in the shown instruction format is made blank.

The instruction format shown in FIG. 3B is different from the instruction format shown in FIG. 3A in that a field for a forward map information extension flag is added. When it is unnecessary to designate the result value register and the left operand register or the right operand register as in the above mentioned case, this forward map information extension flag is used to store the forward map information into the black field and therefore to efficiently utilize the blank field. Namely, the forward map information extension flag indicates whether the result register field, the left operand register field and the right operand register field designate the result register, the left operand register and the right operand register, respectively, .or alternatively stores the forward map information. Incidentally, although not shown, in an alternative embodiment, when it is unnecessary to designate the result value register and the left operand register or the right operand register, it is possible to omit the unnecessary field(s) to realize a variable length instruction format.

In the instruction format shown in FIG. 3C, each of the arithmetic operation instruction and the memory access instruction is constituted of two fields designating the instruction code and the forward map information, respectively. In this shown example of the instruction format, namely, the result value register, the left operand register and the right operand register are not designated. The instruction of this instruction format receives all the input operands by receiving the result values of other instructions by means of designation of the forward map information, and supplies all the result value generated as the result of execution of the instruction concerned to input operands of other instructions by means of designation of the forward map information in the instruction concerned.

In the example of this instruction format, a register access instruction is provided as another instruction type. This register access instruction is constituted of three field designating the instruction code, the register and the forward map information, and is used for writing into the register or reading from the register. When some value is read out from the register, an input operand of another instruction using the read-out value is designated by the forward map information. In the example of this instruction format, all of register accesses are realized by the register access instruction.

In the above description, a conditional branch instruction and a non-conditional branch instruction are not described. Since these instructions generates no result value, it is sufficient if the branch destination address are stored in the forward map information field and the result value field of the instruction format for the arithmetic operation instruction.

FIGS. 4A and 4B and FIGS. 5A and 5B illustrate a relation between the relative input operand number and the relative instruction number, used in the first embodiment of the present invention. FIGS. 4A and 4B illustrate a unidirectional type of the relative input operand number and the relative instruction number, and FIGS. 5A and 5B illustrate a bidirectional type of the relative input operand number and the relative instruction number.

Here, the unidirectional type means to number from an instruction next to a given instruction or from input operands of the instruction next to the given instruction, in the order of instruction addresses. On the other hand, the unidirectional type means to number from an instruction located before a given instruction in the order of instruction addresses, or from input operands of the before-located instruction, in the order of instruction addresses. In 4A and 4B and FIGS. 5A and 5B, squares indicate instructions, and circles indicates operands of instructions. The number indicated in a circle indicates the bit position within the forward map information designating the corresponding input operand. In the case that the relative input operand number is used, the bit position within the forward map information designating some input operand is consistent with the relative input operand number of the same operand.

In the unidirectional type of the relative input operand number shown in FIG. 4A, the relative input operand numbers are allocated, in accordance with the order of instruction addresses, from a right input operand of an instruction next to the given instruction, to a left input operand of the instruction next to the given instruction, to a right input operand of an instruction next to the instruction next to the given instruction, and then to a left input operand of the instruction next to the instruction next to the given instruction. Therefore, when the relative input operand number is used, the bit position within the forward map information designating a respective input operand corresponds to the relative input operand number of the same operand.

In the unidirectional type of the relative instruction number shown in FIG. 4B, the relative instruction numbers are allocated, in accordance with the order of instruction addresses, from an instruction next to the given instruction, to an instruction next to the instruction next to the given instruction. This relative instruction numbers are indicated within the squares, respectively. When the relative instruction number is used, the bit position within the forward map information designating a respective input operand, is calculated for example as shown in FIG. 4B. As shown in FIG. 4B, in the forward map information designated by using the relative instruction number, when the number of the input operand(s) is smaller than the maximum operand number which can be taken in an arbitrary instruction, not-used bit positions are generated in the forward map information. In the shown example, the third and fifth bit positions correspond to no input operand.

In the bidirectional type of relative input operand number shown in FIG. 5A, the relative input operand numbers are allocated, in accordance with the order of instruction addresses, by considering as a starting point instruction an instruction located before a given instruction in the order of instruction addresses, from a right input operand of the starting point instruction, to a left input operand of the starting point instruction, to a right input operand of an instruction next to the starting point instruction, and then to a left input operand of the instruction next to the starting point instruction. When the relative input operand number is used, the bit position within the forward map information designating a respective input operand corresponds to the relative input operand number of the same operand.

In the bidirectional type of relative instruction number shown in FIG. 5B, the relative instruction numbers are allocated, in accordance with the order of instruction addresses, by considering as a starting point instruction an instruction located before a given instruction in the order of instruction addresses, from the starting point instruction, to an instruction next to the starting point instruction, and then to an instruction next to the instruction next to the starting point instruction. This relative instruction numbers are indicated within the squares, respectively. When the relative instruction number is used, the bit position within the forward map information designating a respective input operand, is calculated for example as shown in FIG. 5B. Similarly, in the forward map information designated by using the bidirectional type of relative instruction number, when the number of the input operand(s) is smaller than the maximum operand number which can be taken in an arbitrary instruction, not-used bit positions are generated in the forward map information.

As mentioned above, when the relative input operand number is used, all the bits within the forward map information correspond to input operand numbers. On the other hand, when the relative instruction number is used, there is a case in which bits corresponding to no input operand exist in the forward map information. From a viewpoint of a recording density, the relative input operand number is more efficient, but the relative instruction number is more excellent in the point that it is easy to understand correspondence between the instruction and the input operand number. In the following description, explanation will be made on only cases in which the relative instruction number is used.

In addition, in the forward map information using the unidirectional type relative instruction number and relative input operand number, it is possible to have only the forward map information for input operands in instructions succeeding to the given instruction in the order of instruction addresses. On the other hand, in the forward map information using the bidirectional type relative instruction number and relative input operand number, it is possible to have the forward map information for input operands in instructions preceding and succeeding to the given instruction in the order of instruction addresses. This is advantageous when the program sequence is different from the order of instruction addresses by for example a branch instruction jumping to an instruction before the branch instruction in the order of instruction addresses, because it is possible to have the forward map information in accordance with the program sequence. In any case, which is used, can be set for each instruction independently of other instructions. In the following description, explanation will be made on only the unidirectional forward map information.

The multiple instruction parallel issue/execution management method in accordance with the present invention is realized with the multiple instruction parallel issue/ execution management unit 12 shown in FIG. 1, by using the instruction format including the forward map information as explained with reference to FIGS. 2A to 5B. The units included in the processor 10 other than the multiple instruction parallel issue/execution management unit 12 are the same as those included in a processor based on the prior art superscalar technology, and further explanation thereof will be omitted. In the following, therefore, the multiple instruction parallel issue/execution management unit 12 will be described.

Figure 6:
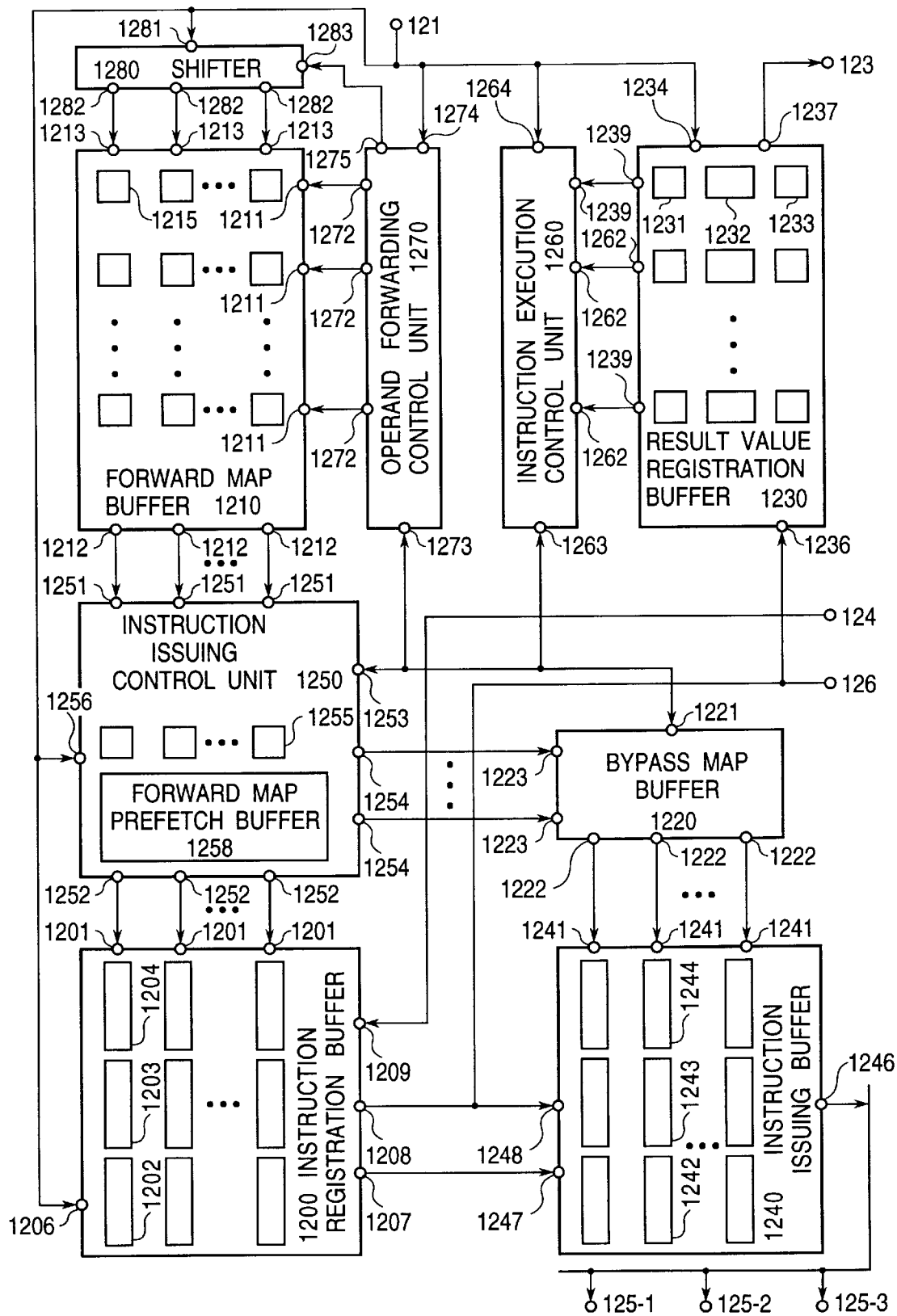
FIG. 6 is a block diagram of the multiple instruction parallel issue/execution management unit in accordance with the first embodiment of the present invention.

Referring to FIG. 6, there is shown a block diagram illustrating the construction of the multiple instruction parallel issue/execution management unit 12 in the first embodiment of the present invention. As shown in FIG. 6, the multiple instruction parallel issue/execution management unit 12 includes an instruction registration buffer 1200, a forward map buffer 1210, a bypass map buffer 1220, a result value registration buffer 1230, an instruction issuing buffer 1240, an instruction issuing control unit 1250, an instruction execution control unit 1260, a operand forwarding control unit 127 and a shifter 1280, coupled as shown.

Figure 7:
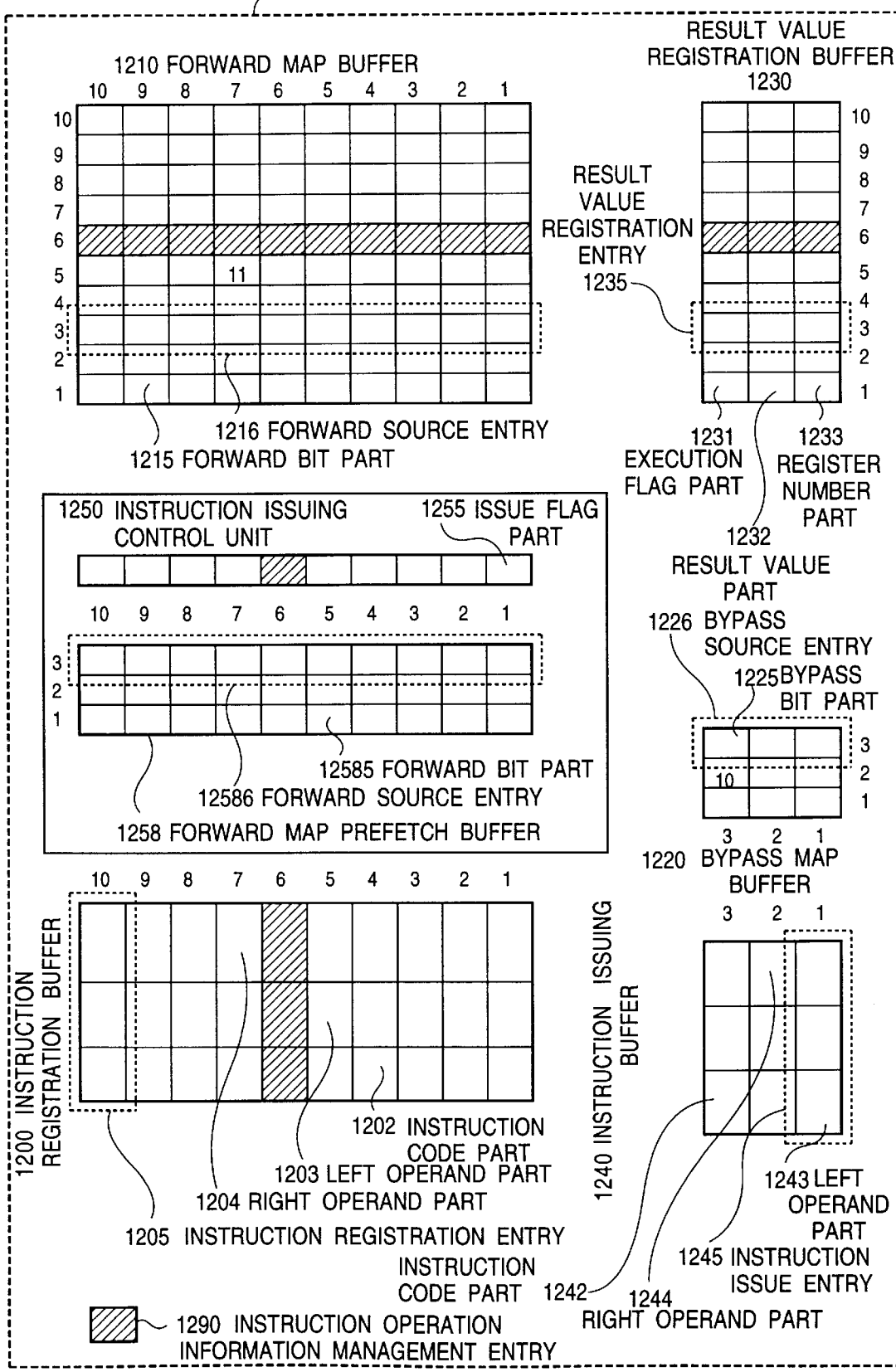
FIG. 7 illustrates, in a simplified form, an internal structure of the multiple instruction parallel issue/execution management unit in accordance with the first embodiment of the present invention.

FIG. 7 illustrates, in a simplified form, an internal structure of the instruction registration buffer 1200, the forward map buffer 1210, the result value registration buffer 1230, the instruction issuing buffer 1240, and the instruction issuing control unit 1250, for illustrating an operation of the multiple instruction parallel issue/execution management unit in accordance with the first embodiment of the present invention. In FIG. 7, for the purpose of making it easier to understand the operation, external and internal connection of respective blocks are omitted. In the following, the construction and the operation of the multiple instruction parallel issue/execution management unit 12 will be described.

The instruction registration buffer 1200 holds the instruction code information and the two input operands of each of the not-yet-issued instructions, the under-execution instructions and the not-yet-decided instructions. As shown in FIG. 7, the instruction registration buffer 1200 is constituted by arranging "N" instruction registration entries 1205 in N columns. Here, "N" is a total number of the not-yet-issued instructions, the under-execution instructions and the not-yet-decided instructions, whose instruction operation information can be held in the multiple instruction parallel issue/execution management unit 12. In the example shown in FIG. 7, N=10.

In the instruction registration buffer 1200, the instruction operation information is registered in the instruction registration entries 1205 in the order of instructions decoded in accordance with the program sequence of the instructions. In FIG. 7, the numbers given to one column of instruction registration entry 1205 is so that a smaller number means an instruction at an early position in the program sequence. However, when the instruction operation information is registered until a 10th column instruction registration entry 1205, a next instruction operation information is cyclically registered until a first column instruction registration entry 1205. In the following, an "x"th instruction indicates an instruction stored at the "x"th column instruction registration entry 1205. In addition, when in the instruction registration buffer 1200 there is no instruction registration entry 1205 which can register a new instruction operation information, the instruction fetch/decode unit 11 stops supplying of the instruction operation information.

Each one instruction registration entry 1205 comprises an instruction code part 1202, a left operand part 1203 and a right operand part 1204. The instruction code part 1202 stores the instruction code, and the left operand part 1203 and the right operand part 1204 stores two operands at maximum for each one instruction. When only one input operand is used, the left operand part 1203 is used to store the input operand.

The instruction registration buffer 1200 includes instruction registration entry designation input terminals 1201, an instruction code registration terminal 1206, an instruction output terminal 1207, an operand forward input terminal 1208, and a register operand input terminal 1209. The instruction registration entry designation input terminals 1201 include "N" instruction registration entry designation input terminals 1201 corresponding to the "N" instruction registration entries 1205.

The forward map buffer 1210 stores the forward map information designated in the instruction as mentioned above. The forward map buffer 1210 is constituted of forward bits 1215 arranged in the form of a square matrix of N×N. Here, "N" is the maximum number of the instructions which can be held in the multiple instruction parallel issue/execution management unit 12. In the example shown in FIG. 7, N=10 as mentioned above. As shown in FIG. 7, one row of forward bits 1215 is called a forward source entry 1216.

This forward source entry 1216 stores the forward map information in each instruction. One forward source entry 1216 stores the two-bit forward map information indicating dependency between one result value and an input operand of a certain instruction. The number of forward bits in the forward source entry 1216, namely, "N", must be larger than the number of succeeding instructions which can be designated by the forward map information in each instruction, namely, "D" mentioned above.

A "y"th row forward source entry 1216 holds the forward map information of the "y"th instruction held in the multiple instruction parallel issue/execution management unit 12. Here, assume that the two-bit information at the "x" column and at the "y" row is "ab". Each of "a" and "b" is one-bit information. If "a" is "1", it means that the result value of the "y"th instruction is used as a left operand of the "x"th instruction, and if "a" is "0", it is not used. In addition, if "b" is "1", it means that the result value of the "y"th instruction is used as a right operand of the "x"th instruction, and if "b" is "0", it is not used. For example, when the flag at the position of y=7 and z=5 is "11", it means that the result value of the 5th instruction is used as a left operand and a right operand of the 7th instruction.

As will be described later, the forward map information stored in the forward map buffer 1210 is used for realizing a function of transferring the not-yet-decided result value to the input operand of the not-yet-issued instruction. This function is called an "operand forward". The operand forward indicates an operation of writing a desired not-yet-decided result value into the left operand part 1203 and the right operand part 1204 of the instruction registration entry 1205 storing the not-yet-issued instruction.

The forward map buffer 1210 includes forward map registration/output control terminals 1211, forward map output/issue flag input terminals 1212, and forward map registration terminals 1213. The forward map registration/output control terminal 1211, the forward map output/issue flag input terminal 1212, and the forward map registration terminals 1213 respectively include "N" terminals corresponding to the forward bits 1215 of the N rows and the N columns.

The bypass map buffer 1220 is constituted of bypass bit parts of J rows and K columns. Here, "J" indicates the number of instructions, execution of which are simultaneously completed, and K" shows the number of instructions which can be issued simultaneously. In the example shown in FIG. 7, J=3 and K=3. This corresponds to the construction of the processor 10 shown in FIG. 1. Each of the bypass bit parts 1225 stores two-bit information indicating whether or not the not-yet-decided result value is bypassed to the left and right input operands of the instruction issue entry 1245 in the instruction issue buffer 1240. One row of the bypass bit parts 1225 is called a "bypass source entry" 1226.

The respective bypass source entries 1226 in the bypass map buffer 1220 correspond to the result values generated in the memory access unit 14 and the arithmetic and logic units 15 and 15, respectively. For example, in the example shown in FIG. 7, a first row bypass source entry 1226 corresponds to the result value generated in the memory access unit 14 shown in FIG. 1, and a second row bypass source entry 1226 corresponds to the result value generated in the arithmetic and logic unit 15 positioned adjacent to the memory access unit 14 in FIG. 1. A third row bypass source entry 1226 corresponds to the result value generated in the arithmetic and logic unit 15 positioned at a right side in FIG. 1. Each column in the bypass map buffer 1220 corresponds to a column of instruction issue entries 1245, at the same column position, in the instruction issuing buffer 1240. Therefore, if the bypass bit part 1225 at the second row and at third column is "10" as shown in FIG. 7, it means that the result value generated in the arithmetic and logic unit 15 positioned adjacent to the memory access unit 14 in FIG. 1, is bypassed to the left operand part 1243 of the instruction at the third column instruction issue entry 1245 in the instruction issue buffer 1240. The operand bypass operation will be described later.

The bypass map buffer 1220 includes a bypass map registration/output control terminal 1221, a bypass map output terminal 1222, and a bypass map registration terminal 1223. The bypass map output terminal 1222 includes "K" terminals, and the bypass map registration terminal 1223 includes "J" terminals.

The result value registration buffer 1230 stores the not-yet-decided result values of the "N" instructions held in the multiple instruction parallel issue/execution management unit 12. The result value registration buffer 1230 includes "N" result value registration entries 1235, and a "y"th result value registration entry 1235 stores the result value corresponding to the "y"th instruction. Each result value registration entry 1235 includes a result value part 1232 for actually holding the result value, an execution flag part 1231 for storing an execution flag indicative of an execution condition of each instruction, and a register number part 1233.

The result value registration buffer 1230 includes a write register designation terminal 1234, result value registration entry designation input terminals 1239, a result value registration terminal 1236 and a result value output terminal 1237. The result value registration entry designation input terminals 1239 include "N" terminals.

The instruction issuing buffer 1240 temporarily holds the not-yet-issued instructions which can be issued in a next operation cycle. The instruction issuing buffer 1240 includes instruction issuing entries 1245 of "K" columns corresponding to the number of instructions which can be issued simultaneously. In the example shown in FIG. 7, the instruction issuing buffer 1240 includes three instruction issuing entries 1245, to correspond to the processor 10 shown in FIG. 1. Each instruction issuing entry 1245 includes the instruction code part 1242, the left operand part 1243 and the right operand part 1244, which temporarily stores the instruction code information, the left operand and the right operand of the instruction to be issued.

Respective instruction issuing entries 1245 of the instruction issue buffer 1240 correspond to the memory access unit 14 and the arithmetic and logic units 15 and 15, respectively, to which the respective instructions are to be supplied. For example, in the example shown in FIG. 7, a first column instruction issuing entry 1245 holds the instruction to be issued to the memory access unit 14 shown in FIG. 1, and a second column instruction issuing entry 1245 holds the instruction to be issued to the arithmetic and logic unit 15 positioned adjacent to the memory access unit 14 in FIG. 1. A third column instruction issuing entry 1245 holds the instruction to be issued to the arithmetic and logic unit 15 positioned at a right side in FIG. 1.

The instruction issue buffer 1240 includes a bypass map input terminal 1241, an instruction issuing terminal 1246, an instruction receiving terminal 1247 and an operand bypass input terminal 1248. The bypass map input terminal 1241 includes "K" terminals.

The instruction issuing control unit 1250 controls the instruction registration buffer 1200, concerning into which of the instruction registration entries 1205 a new instruction is to be registered, into which of the instruction registration entries 1205 the not-yet-decided result value is to be forwarded as an operand, from which of the instruction registration entries 1205 an instruction is to be transferred to the instruction issue buffer 1240. The instruction issuing control unit 1250 internally comprises issue flag parts 1255 and a forward map prefetch buffer 1258. The issue flag parts 1255 includes "N" flag parts, each of which holds an issue flag indicative an issue condition of a corresponding instruction registration entry 1205. The forward map prefetch buffer 1258 temporarily holds the information of the forward source entries 1216 corresponding to the "J" rows. Therefore, the forward map prefetch buffer 1258 is composed of forward source entries 12586 arranged in "J" rows and each composed of "N" forward bit parts 12585. Each of the forward bit parts 12585 temporarily stores the two-bit content of the forward bit part 1215, as it is. Here, "J" is the maximum number of instructions, execution of which can be completed simultaneously. In the example shown in FIG. 7, J=3. The forward source entries 12586 of the forward map prefetch buffer 1258 correspond to the result values of the memory access unit 14 and the two arithmetic and logic units 15, respectively, similarly to the bypass source entries 1226. This correspondence is determined to be similar to the bypass source entries 1226 at the same row.

The instruction issuing control unit 1250 includes forward map input/issue flag output terminals 1251, instruction registration entry designation output terminals 1252, a control information input/output terminal 1253, bypass map output terminals 1254, and an instruction registration control terminal 1256. The forward map input/issue flag output terminals 1251 and the instruction registration entry designation output terminals 1252 respectively include "N" terminals, and the bypass map output terminals 1254 include "J" terminals.

The instruction execution control unit 1260 controls as to designate the result value and the register number of which instruction is registered into which result value registration entry 1235 in the result value registration buffer 1230, to designate the result value of which result value registration entry 1235 is decided, and to control the execution flags in the execution flag parts 1231 of the respective result value registration entries 1235. The instruction execution control unit 1260 includes result value registration entry designation output terminals 1262, a control information input/output terminal 1263, and an instruction execution control terminal 1264. The result value registration entry designation output terminals 1262 include "N" terminals.

The operand forwarding control unit 127 manages the registration of the forward map information, and controls into which input operand the not-yet-decided result value is forwarded. The operand forwarding control unit 127 includes forward map registration/output indication terminals 272, a control information input/output terminal 1273, a forward map registration control terminal 1274, and a shift width designation output terminal 1275. The forward map registration/output indication terminals 272 include "N" terminals.

The shifter 1280 shifts the forward map information designated in the instruction by a left cyclic shifting and by a "0" extension, and then, causes the forward map information thus processed, to be stored in the forward map buffer 1210. The shifter 1280 includes a forward map input terminal 1281, forward map output terminals 1281 and a shift width designation output terminal 1283.

The following summary indicates where an arbitrary instruction ("n"th instruction) whose instruction operation information is managed by the multiple instruction parallel issue/execution management unit 12, is stored.

(1) In the "n"th column instruction registration entry 1205, the instruction code information and the left and right input operands are stored.

(2) In the "n"th column issue flag part 1255, the issue flag is stored.

(3) In the "n"th row forward source entry 1216, the forward map information is stored.

(4) In the "n"th row result value registration entry 1235, there are stored the result value and the register number where the execution flag and the result value are to be written.

In the following, all the above mentioned entries will be called in combination, as an instruction operation information management entry 1290 for the "n"th instruction. For example, the instruction operation information management entry 1290 shown in FIG. 7 is for a sixth instruction. When the instruction fetch/decode unit 11 transfers the instruction operation information for a plurality of instructions, to the multiple instruction parallel issue/execution management unit 12, the instruction operation information for the plurality of instructions are written into a plurality of instruction operation information management entries 1290. Basically, the instruction operation information management entry 1290 having a smaller number corresponds to an early instruction in the program sequence, but since the instruction operation information management entries 1290 are cyclically used, the instruction operation information next to the instruction operation information stored into the "N"th column instruction operation information management entry 1290, is stored into the first column instruction operation information management entry 1290.

FIG. 8 illustrates the status taken by the issue flag stored in the issue flag part 1255. The status of the issue flag of an "n"th column issue flag part 1255 indicates the states concerning the issuing, of the "n"th instruction stored in the "n"th instruction operation information management entry 1290. The status designated by the issue flag abbreviation "em" indicates that the corresponding instruction operation information management entry 1290 is in an empty condition having no effective instruction operation information. The status designated by the abbreviation "–" indicates that the decoded instruction is received and registered, but whether or not it is issuable has not yet been checked. The status designated by the abbreviation "rd" indicates that all necessary input operand are complete and the instruction is issuable. The status designated by the abbreviation "wa" indicated that all necessary input operand have not yet become complete and the instruction is not issuable. The status designated by the abbreviation "is" indicates that the instruction has already been issued.

FIG. 9 illustrates the status taken by the execution flag stored in the execution flag part 1231. The status of the execution flag of an "n"th row execution flag part 1231 indicates the status concerning the execution, of the "n"th instruction stored in the "n"th instruction operation information management entry 1290. The status designated by the execution flag abbreviation "em" indicates that the corresponding instruction operation information management entry 1290 is in an empty condition having no effective instruction operation information. The status designated by the abbreviation "ni" indicates that the corresponding instruction has not yet been issued. The status designated by the abbreviation "ex" indicates that the corresponding instruction has already been issued and is being executed by the memory access unit 14 or the arithmetic and logic unit 15. The status designated by the abbreviation "es" indicates that the corresponding instruction has already been issued in a speculative condition based on a branch prediction and is being executed by the memory access unit 14 or the arithmetic and logic unit 15. The status designated by the abbreviation "do" indicates that the execution of the corresponding instruction has already been completed, and a not-yet-decided result value is obtained. The status designated by the abbreviation "ds" indicates that the execution of the corresponding instruction has already been completed in the speculative condition based on the branch prediction, and a not-yet-decided result value is obtained.

When the issue flag corresponding to some instruction operation information management entry 1290 is "em", a corresponding execution flag is necessarily "em". If the issue flag assumes any of "–", "rd" and "wa", the corresponding execution flag is "ni". If the execution flag is any of "ex", "ex", "do" and "do", the corresponding issue flag is "is". By comparing with definition of the not-yet-issued instruction, the under-execution instruction and the not-yet-decided instruction, the not-yet-issued instruction is an instruction whose issue flag assumes any of "–", "rd" and "wa". The under-execution instruction is an instruction whose execution flag assumes any of "ex" and "es", and the not-yet-decided instruction is an instruction whose execution flag assumes any of "do" and "ds". The result of execution of a given instruction is decided when the condition of the given instruction is "do" and the conditions of all the instructions fetched and decoded before the given instruction in time are "do". The conditions "es" and "ds" are changed into "ex" and "do", respectively, when it has been found that the branch prediction is correct, and the speculative condition is dissolved. If it has been found that the branch prediction is not correct, all the in not-yet-decided result values of the under-execution instructions and the not-yet-decided instructions after the branch prediction are canceled.

Figures 10, 11:
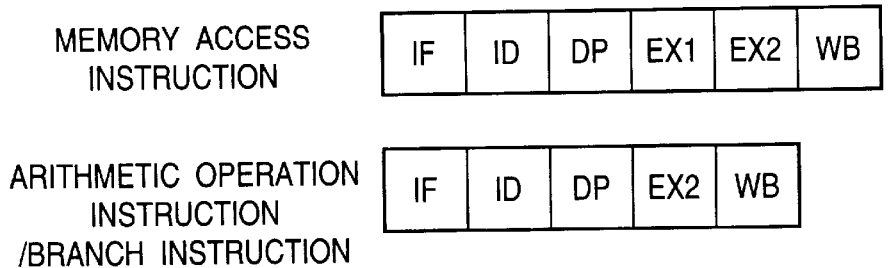
FIG. 10 illustrates examples of the pipeline operation timing, in the processor in accordance with the first embodiment of the present invention.
FIG. 11 illustrates an example of the pipeline operation timing of the multiple instruction parallel issue/execution management unit in accordance with the first embodiment of the present invention.

FIG. 10 illustrates examples of the pipeline operation timing, in the processor 10 shown in FIG. 1. FIG. 10 shows, as an example, the most basic pipeline timing for simplifying the following description. The shown pipeline timing is based on a typical pipeline operation in the prior art superscalar processor.

FIG. 10 illustrates that a memory access instruction operates in a six-stage pipeline, and an arithmetic operation instruction and a branch instruction operate in a five-stage pipeline. "IF" indicates a pipeline stage for executing an instruction fetch, and "ID" indicates a pipeline stage for executing an instruction decoding. "ID" indicates a pipeline stage for executing an instruction dispatch, and "EX1" and "EX2" indicate a pipeline stage for executing an operation. "WB" indicates a pipeline stage for executing the writing back to the register or the memory. If the instruction cannot be immediately issued, the DP stage is repeated in a plurality of cycles. In addition, if a desired data does not exist in the data cache memory 16, the EX1 stage is repeated in a plurality of cycles.

FIG. 11 illustrates how the operation of the multiple instruction parallel issue/execution management unit 12 is executed in respective pipeline stages. The related pipeline stages "ID", "DP", "EX2" and "WB" are shown with being divided into a first half and a second half of the cycle. In a second half of the ID stage, the instruction registration operation is executed. In a first half of the DP stage, the operand registration operation is executed, and in a second half of the DP stage, the instruction issuing operation is executed. In a first half of the EX2 stage, the operand forwarding reserving operation is executed, and in a second half of the EX2 stage, the operand bypassing operation is executed. In a first half of the WB stage, the execution ending (or completing) operation is executed, and in a second half of the WB stage, the operand forwarding operation is executed.

Now, the operation of the multiple instruction parallel issue/execution management unit 12 will be described with reference to FIGS. 6 to 11, with being divided into the above mentioned seven basic operations, namely, the instruction registration, the operand registration, the instruction issuing, the operand forwarding reserving, the operand bypassing, the execution ending (or completing), and the operand forwarding, separately. In the following description, these operations concerning one given instruction will be described. However, in the multiple instruction parallel issue/execution management unit 12, a plurality of instructions simultaneously cause the same or different operations. In addition, it should be understood that, unless specially noted, the forward map information and the instruction format of the instruction including the forward map information are the same although any construction is taken.

First, the instruction registration operation will be described. In the instruction registration, the instruction operation information concerning a plurality of instructions, transferred from the instruction fetch/decode unit 11 through the decode information input terminal 121, are stored in empty instruction operation information management entries 1290, respectively. The instruction issue control unit 1250, the instruction execution control unit 1260 and the operand forwarding control unit 1270 respectively receive through the instruction registration control terminal 1256, the instruction execution control terminal 1264 and the forward map registration control terminal 1274, an instruction as to the number of instructions to be registered, and commonly have the information concerning the empty instruction operation information management entries 1290 through the control information input/output terminals 1253, 1263 and 1273. Thus, it is determined to arrange the instruction operation information in the order in accordance with the program sequence. Here, "empty" indicates that both the issue flag and the execution flag are "em". The issue flag and the execution flag corresponding to the registered instruction operation information management entry 1290 become "–" and "ni", respectively.

As mentioned above, the instruction operation information management entries 1290 are cyclically used. Namely, when one instruction is registered in the 10th instruction operation information management entry 1290, an instruction next to the one instruction in the program sequence is registered in the first instruction operation information management entry 1290. If there is no empty instruction operation information management entry 1290, the instruction fetch/decode unit 11 stops the transfer of the instruction operation information.

As mentioned hereinbefore, the instruction operation information is constituted of the instruction code information, the register writing information and the forward map information. The instruction code information is stored through the instruction code registration terminal 1206 to the instruction code part 1202 of the instruction code buffer 1200. The register writing information is stored through the write register designation terminal 1234 to the register number part 1233 of the result value registration buffer (register map buffer) 1230. The forward map information is subjected to the left cyclic shifting and the "0" extension by the shifter 1280, and then, is stored through the forward map registration terminal 1213 into the forward source entry 1216 of the forward map buffer 1210.

The width of the left cyclic shifting in the shifter 1280 is controlled through the shift width control terminal 1283 by the operand forwarding control unit 1270. For example, assuming that the forward map information of a given instruction is to be registered in the "n"th row forward source entry 1216, the forward map information is cyclically shifted in a left direction by 2×n bits. Here, the left cyclic shifting means that when the forward map information is overflowed from the left end of the forward source entry 1216, the overflowed portion is set into the right side of the forward source entry 1216. In the forward source entry 1216, a portion which is filled with the forward map information obtained by the left cyclic shifting, is filled with the value "0". This is the "0" extension.

The reason for executing the left shifting by the shifter 1280 as mentioned above, is that the forward map information uses the relative instruction number obtained from the given instruction. The reason for setting the forward map information overflowed from the left end of the forward source entry 1216, into the right side of the forward source entry 1216, is that the instruction operation information management entries 1290 are cyclically used. In addition, the reason for performing the "0" extension, is that when the forward source entry 1216 can hold the forward map information of the input operands in a range wider than that covered by the forward map information designated in the instruction, the operand forwarding is never conducted to the input operand corresponding to the difference.

Incidentally, at the time of registering the forward map information, if the forward map information is of the unidirectional type, when the forward bit part 1215 in some column becomes to include the value "1" as the result of the registration, the issue flag part 1255 corresponding to that column must have the issue flags other than "wa" and "–", in the condition before the registration. If this condition is not satisfied, even if the instruction operation information management entry 1290 itself is registrable, the instruction registration operation is stopped until the condition is satisfied. The forward map buffer 1210 performs the above mentioned control by reading the status of the issue flags through the forward map output/issue flag input terminals 1212. On the other hand, if the forward map information of the bidirectional type is used, this control is not necessary.

Next, the operand registration operation will be described. In this operand registration, the input operand read out from the register file 13 is registered in the instruction registration buffer 1200. The input operand is supplied through the register file read data terminal 124, and supplied through the register operand input terminal 1209 to instruction registration buffer 1200. Which of the left or right input operand parts the input operand is registered in, is designated through the instruction registration entry designation input terminal 1201 by the instruction issue control unit 1250.

When the not-yet-decided result value corresponding to the register 135 designated as the input operand exists in the result value registration buffer 1230, it is not possible to read the input-operand from the register file 13. In this case, in the shown embodiment, until the corresponding not-yet-decided result value is written into the register file 13, it is not allowed to register the input operand. Therefore, the instruction repeatedly executes the DP stage. Here, the register file 13 stores and manages the register busy information indicating whether or not the values stored in each register 135 can be used as the input data, similarly to the prior art.

When all the necessary operands become complete by the reading from the register file 13 and the operand forwarding reserving operation which will be explained later, the instruction issue control unit 1250 sets the issue flag part 1255 corresponding to the given instruction, to the "rd" condition. Otherwise, it is set to the "wa" condition.

Now, the instruction issuing operation will be described. The instruction registration buffer 1200 is investigated to find out, the instruction registration entries 1205 in the "rd" condition, and the instruction registration entries 1205 to be actually issued are selected from the instruction registration entries 1205 in the "rd" condition. The instruction operation information of the selected instruction registration entries 1205 is transferred through the instruction output terminal 1207 to the instruction issue entry 1245. Here, as mentioned above, to which of the instruction issue entries 1245 the instruction is outputted, is determined by to which of the memory access unit 14 and the arithmetic and logic units 14 the instruction is to be issued. The information of the forward map prefetch buffer 1258 of the column corresponding to the selected instruction registration entry 1205 is transferred through the bypass map output terminal 1254 to the column in the bypass map buffer 1220, which is the same column position as the transfer destination column of the instruction issue entry 1245. For example, assuming that the instruction operation information in the "n"th column instruction registration entry 1205 is transferred to the "m"th column instruction registration entry 1245, the content of the "n"th column in the forward map prefetch buffer 1258 is transferred to the "m"th column of the bypass map buffer 1220.

As mentioned above, the respective instruction issue entry 1245 in the instruction issue buffer 1240 corresponds to the memory access unit 14 or the arithmetic and logic unit 15 or 15, which is the instruction issue destination. In the embodiment shown in FIG. 7, for example, the first column instruction issue entry 1245 holds the instruction to be issued to the memory access unit 14, and the second column instruction issue entry 1245 holds the instruction to be issued to the central arithmetic and logic unit 15. The third column instruction issue entry 1245 holds the instruction to be issued to the right side operation unit 15.

Thereafter, at a heading of the succeeding EX1 or EX2 stage, the instruction is actually issued from the instruction issue buffer 1240 to the memory access unit 14 or the arithmetic and logic unit 15 or 15.

Next, the operand forwarding reserving-operation will be described. In the first half of the EX2 stage, it becomes apparent that the execution of the given instruction is completed in a next cycle. Therefore, the multiple instruction parallel issue/execution management unit 12 selects the not-yet-issued instruction(s) which uses the result value of the given instruction as the input operand, and checks whether or not all the input operands of the selected instruction have become complete, and then, sets the corresponding issue flag to "rd" when the operands have become complete. Specifically, the following operation is executed.

Now, assume that the "n"th instruction enters in the EX2 stage. The operand forwarding control unit 1270 receives this information from the instruction execution control unit 1260 through the control information input/output terminal 1273, and access to the "n"th row forward source entry 1216 in the forward map buffer 1210 through the forward map output indication terminal 1272. The 2N-bit information in the "n"th row forward source entry 1216 is read out through the "N" forward map output/issue flag input terminals 1212, and supplied to the instruction issue control unit 1250. As mentioned above, the read-out 2N-bit information of the "n"th row forward source entry 1216 indicates which of instruction uses the result value of the "n"th instruction as the left operand or the right operand. The instruction issue control unit 1250 checks this forward map information and the status of the "N" issue flag parts 1255, so as to find out from the instruction registration entries 1205 having the issue flag of "–" or "wa", an instruction whose input operands become complete by forwarding the result value of the "n"th instruction. Then, the issue flag of the found-out instruction is set to "rd".

For example, when the forward map information given by some column forward map input/issue flag output terminal 1251 is "11", since all the input operands become complete, the issue flag of that column is brought to "rd". Alternatively, when the forward map information given by some column forward map input/issue flag output terminal 1251 is "10", if the corresponding instruction has already received the right operand, since all the input operands become complete, the issue flag of that column is brought to "rd".

The information of the forward source entry 1216 supplied to the instruction registration buffer 1200 is temporarily stored in the forward map prefetch buffer 1258 in the instruction issue control unit 1250. The respective forward source entry 12588 in the forward map prefetch buffer 1258 is previously determined to correspond to the result value generated from which of the memory access unit 14 and the arithmetic and logic units 15. For example, the first row forward source entry 12588 corresponds to the result value of the memory access unit 14 of the processor 10 shown in FIG. 1, the second row forward source entry 12588 corresponds to the result value of the central arithmetic and logic unit 15. The third row forward source entry 12588 corresponds to the result value of the right side arithmetic and logic unit 15.

Now, the operand bypassing operation will be explained. With the operand forwarding reserving, the corresponding issue flag part 1255 is brought to the "rd" condition before the input operands actually become complete in an instruction registration entry 1205. Therefore, by the above mentioned instruction issue operation, before the input operands actually become complete, the instruction operation information of the instruction registration entry 1205 is transferred to the instruction issue buffer 1240, and therefore, the instruction becomes an instruction to be issued. In the operand bypassing operation, in order to cope with this situation, the necessary input operand is bypassed from the result bus 17 directly to the instruction issue buffer 1240. Specifically, the following operation is conducted.

In the second half of the EX2 stage, the result value is generated by the memory access unit 14 or the arithmetic and logic unit 15, and then, transferred to the result bus 17. This result value is supplied through the result input terminal 126 and the operand bypass input terminal 1248 to the instruction issue buffer 1240, so that, if there is the instruction issue entry 1245 requiring the result value as the input operand, the result value is written into the left operand part 1243 or the right operand part 1244 of the instruction issue entry 1245 requiring the result value. Here, whether or not such an instruction issue entry 1245 exists, is instructed through the bypass map input terminal 1241 by the bypass map information registered in the bypass map buffer 1220 by the instruction issue operation.

Similarly to the forward map prefetch buffer 1258, each row of the bypass map buffer 1220 is previously determined to hold the bypass map information corresponding to the result value of which of the memory access unit 14 and the arithmetic and logic units 15. For example, the first row of the bypass map buffer 1220 corresponds to the result value of the memory access unit 14 of the processor 10 shown in FIG. 1, the second row of the bypass map buffer 1220 corresponds to the result value of the central arithmetic and logic unit 15. The third row of the bypass map buffer 1220 corresponds to the result value of the right side arithmetic and logic unit 15. Respective columns of the bypass map buffer 1220 correspond to respective column instruction issue entries 1245 in the instruction issue buffer 1240.

Next, the execution ending (or completing) operation will be described. The result value supplied through the result value input terminal 126 is registered through the result value registration terminal 1236 to the result value registration entry 1235 within the result value registration buffer 1230 and corresponding to the given instruction. Into which of the result value registration entries 1235 the result value is to be registered, is designated by the instruction execution control unit 1260 through the result value registration entry designation output terminal 1262. The execution flag part 1231 corresponding to the registered result value registration entry 1235 is set to "do" or "ds".

When the result value written by the execution ending operation or the already written not-yet-decided result value is decided, the decided result value is written into the register file 13 in the execution ending operation. The result value stored in which of the result value registration entries 1235 is decided, is designated by the instruction execution control unit 1260 through the result value registration entry designation output terminal 1262. The instruction operation information management entry 1290 corresponding to the decided result value is set to the "em" condition.

Now, the operand forwarding operation will be described. As mentioned above, by the operand forwarding reserving operation in the EX2 stage corresponding to a given instruction, an instruction using the result value of the given instruction is specified. In the operand forwarding operation in the WB stage for the specified instruction, the obtained result value is registered into the left operand part 1203 and the right operand part 1204 in the instruction registration buffer 1200.

Which result value is registered into which left operand part 1203 and which right operand part 1204, is instructed, in the operand forwarding operation for the given instruction, by the content of the forward source entry 12586 previously held in the forward map prefetch buffer 1258. Namely, the result value is forwarded to and registered into the left operand part 1203 or the right operand part 1204 corresponding to the value "1" of the forward map information in the forward source entry 12586. Depending upon the result value of which of the memory access unit 14 and the arithmetic and logic units 15 corresponds to the result value to be registered, the operand forwarding to be executed in accordance with the forward map information of which of the forward source entries 12586, is unambiguously determined.

Figure 12A:
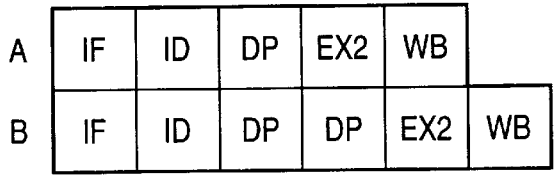
FIGS. 12A, 12B and 12C illustrate three cases of the pipeline operation timing in the processor in connection with two instructions having a data dependency on the register, for explaining an operation of the multiple instruction parallel issue/execution management unit in accordance with the first embodiment of the present invention.
Figure 12B:
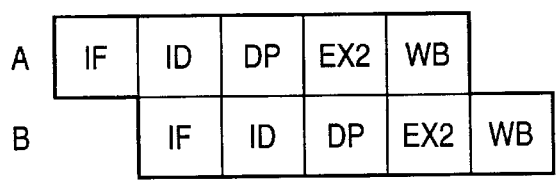
Figure 12C:
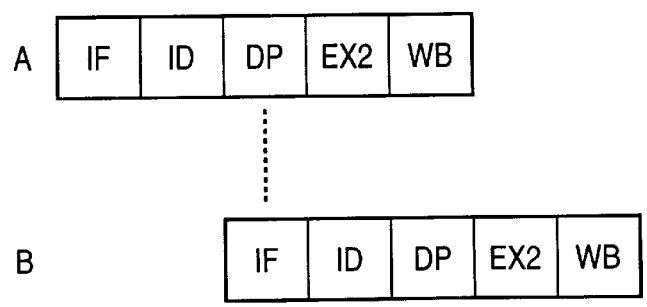

In order to supplement to the above mentioned description of various operations, FIGS. 12A, 12B and 12C illustrate the pipeline processing of two instructions in the case that the result value of an instruction A is used as the input operand of an instruction B, by assuming three pipeline operation timings. Here, it is assumed that all input operands of the instruction A can be read from the register file 13, and input operands of the instruction B become complete by the operand forwarding from the instruction A.

FIG. 12A illustrates the case in which the instruction A and the instruction B are simultaneously fetched and decoded. Since necessary operand of the instruction A become complete in the operand registration operation in the DP stage, the issue flag is set to "rd", and in the instruction issue operation, the instruction A is selected as an instruction to be actually issued, and executed in the next EX2 stage. On the other hand, as regards the instruction B, the forward map information registered in the instruction registration operation indicates that the instruction B requires the result value of the instruction. Accordingly, in the operand registration operation of a first DP stage, necessary operand of the instruction B do not become complete, and therefore, the issue flag is brought to "wa". In the operand forwarding reserving operation of the EX2 stage for the instruction A, using the forward map information of the instruction B registered in the instruction registration operation, it is notified that the input operand required by the instruction B is generated as the result value of the instruction A in a next cycle, and therefore, the issue flag of the instruction B is brought to "rd". Accordingly, in the instruction issue operation of the DP stage in a second cycle, the instruction B is selected as an instruction to be actually issued, and simultaneously, the result value of the instruction A is bypassed to the instruction issue buffer 1240 in the operand bypassing operation, so that the instruction B is executed in a next cycle. The result value of the instruction A is registered and forwarded to the result value buffer 1230 and the instruction registration buffer 1200 in the execution ending operation and the operand forwarding operation of the WB stage, respectively. When the result value of the instruction A is registered into the result value buffer 1230, there is used the forward map information stored in the forward map prefetch buffer 1258 in the operand forwarding reserving operation of the EX2 stage for the instruction A.

FIG. 12B illustrates the case in which the instruction A and the instruction B are fetched and decoded at such different timings that the instruction B is delayed form the instruction A by one cycle. Since necessary operand of the instruction A become complete in the operand registration operation in the DP stage, the issue flag is set to "rd", and in the instruction issue operation, the instruction A is selected as an instruction to be actually issued, and executed in the next EX2 stage. On the other hand, as regards the instruction B, in the operand forwarding reserving operation of the EX2 stage for the instruction A, it is possible to know that the input operand required by the instruction B is generated as the result value of the instruction A in a next cycle, and therefore, the issue flag of the instruction B is brought to "rd". Accordingly, in the instruction issue operation of the DP stage, the instruction B is selected as an instruction to be actually issued, and simultaneously, the result value of the instruction A is bypassed to the instruction issue buffer 1240 in the operand bypassing operation, so that the instruction B is executed in a next cycle. The result value of the instruction A is registered and forwarded to the result value buffer 1230 and the instruction registration buffer 1200 in the execution ending operation and the operand forwarding operation of the WB stage, respectively.

FIG. 12C illustrates the case in which the instruction A and the instruction B are fetched and decoded at such different timings that the instruction B is delayed form the instruction A by two cycles. In this case, the EX2 stage for the instruction A and the ID stage for the instruction B are executed at the same pipeline timing, and the WB stage for the instruction A and the DP stage for the instruction B are executed at the same pipeline timing. In the operand forwarding reserving operation of the EX2 stage for the instruction A, since the instruction B is still in the ID stage, the instruction B has not yet been registered in the multiple instruction parallel issue/execution management unit 12. However, by the forward map information of the instruction A, the result value of the instruction A is forwarded to the instruction operation information registration entry 1290 into which the instruction B will be registered. In the WB stage of the instruction A, the result value of the instruction A is registered and forwarded to the result value buffer 1230 and the instruction registration buffer 1200 by the execution ending operation and the operand forwarding operation, respectively. In the operand registration operation of the DP stage of the instruction B, since it can be known by the above mentioned operand forwarding reserving operation that the input operands are complete, the issue flag is set to "rd". In the instruction issue operation, the result value of the instruction A operand-forwarded to the instruction registration buffer 1200 is used as the operand of the instruction A, and then, is transferred together with the instruction code information to the instruction issue buffer 1240. The instruction B is executed in a next cycle. At this pipeline timing, the input operand can be obtained without intermediary of the operand bypassing operation.

Now, the operation of the multiple instruction parallel issue/execution management unit 12 in the embodiment of the present invention will be described more specifically, with reference to a simple instruction code string.

FIG. 13 shows an example of the instruction string for illustrating the operation of the multiple instruction parallel issue/execution management unit 12 in the embodiment of the present invention. The shown instruction code string is prepared in accordance with the instruction format 1 shown in FIG. 3A. "r1", "r2" and the like indicates the number of the registers 135. Each instruction includes the instruction code, the register 135 into which the result value is to be written, the register 135 from which the left input operand is to be read out, the register 135 from which the right input operand is to be read out, and the forward map information, which are arranged in the named order. In the shown example, therefore, each instruction includes five instruction codes having as a instruction code the unidirectional type forward map information using the relative instruction number.

At the right side of the instruction string, there is given an explanation of an operation of each instruction. "LnL" or "LnR" ("n" is positive integer) means the operand forwarding to the left input operand or the right input operand of an instruction labeled "Ln" ("Ln" is indicated at a leftmost position in FIG. 13). A portion indicated by the blank "_" shows to receive an input operand by the operand forwarding. In addition, the result value generated by execution of each instruction is shown at a rightmost position in FIG. 13.

In the multiple instruction parallel issue/execution management method in the embodiment of the present invention, the forward map information is used to directly indicate, within each instruction, that the result value of an instruction is used as the input operand of another instruction. Therefore, there are many cases that it is not necessary to designate a register for the result value or the input operand. In the shown example, a portion where a register designation is not necessary, is shown as the blank.

FIG. 14 illustrates the value of the respective registers 135 within the register file 13 used in connection with the above description.

FIG. 15 illustrates a pipeline operation timing in the case of the instruction code string shown in FIG. 13. In FIG. 15, "t" is a variable indicating the pipeline cycle number. In the shown example, each three instructions are simultaneously fetched and decoded, and three instructions at maximum are simultaneously executed from the instructions, input operands of which become complete. In a cycle of t=10, execution of the final instruction is completed, and the result value of all the instructions have been decided.

FIGS. 16 to 24 illustrates the operation of the multiple instruction parallel issue/execution management unit 12 when the example shown in FIGS. 13 to 15 is executed. FIGS. 16 to 24 show the internal conditions of the instruction registration buffer 1200, the forward map buffer 1210, the bypass map buffer 1220, the result value registration buffer 1230, the instruction issuing buffer 1240, and the instruction issuing control unit 1250, in accordance with the example shown in FIG. 7, but in nine different pipeline cycles from t=1 to t=9, respectively. In FIGS. 16 to 24 and in the following description, the condition of t=j (J=1 to 9) should be understood to indicate the condition after the operation of the "j"th cycle has been completed but before the operation of the "j+1"th cycle has not yet been started. In FIGS. 16 to 24, in addition, the internal conditions having no relation to the operation are shown in the blank form, for avoiding complicated drawings.

In the condition of t=1 shown in FIG. 16, first three instructions exists in the ID stage. Namely, the shown condition shows that the registration operation for the first three instructions has been completed. In the instruction registration buffer 1200, some number of operands are given with "?". This means that an operand has not yet been registered. One operand is given with "×". This means that only one operand is used in the instruction. The forward map information of the respective instructions are registered in the forward map buffer 1210 after they are subjected to the left-shifting and the 0-extension. Since the operand registration is not conducted, the issue flags for the three instruction are in the "–" condition.

In the condition of t=2 shown in FIG. 17, the first three instructions are in the DP stage, and second three instructions are in the ID stage. The first and second instructions, which have become the "rd" condition by fetching all necessary operands from the register file 13, have been transferred to instruction issue entries 1245 of the instruction issue buffer 1240 determined in accordance with the kind of the instruction, in the instruction issue operation. Since the input operands for the third instruction are not yet complete, the third instruction is brought into the "wa" condition.

In the condition of t=3 shown in FIG. 18, the first and second instructions as mentioned above are issued and therefore are in the EX1 stage. The fourth instruction has become the "rd" condition by fetching all necessary operands from the register file 13, and has been transferred to the instruction issue buffer 1240. Since the "add" instruction of the first instruction is in the EX2 stage, the operand forwarding reserving operation for this first instruction is executed. The forward map information of the first row forward source entry 1216 is transferred to the second row of the forward map prefetch buffer 1258. The second row is designated as a transfer destination, because the first instruction ("add" instruction) was issued from the second row instruction issue entry 1245. In FIG. 18, the first column of the forward map buffer is given with "2" together with an arrow. In addition, in this cycle, there is no instruction which becomes the "rd" condition by the operand forwarding reserving operation. By the instruction registration operation for the seventh instruction, the register number of the result value writing destination is registered in the register number part 1233 of the seventh row result value registration entry 1235.

In the condition of t=4 shown in FIG. 19, the seventh to ninth instructions are in the DP stage, and the instruction registration operation for these instructions are conducted. The first instruction ("add" instruction) is in the WB stage, and therefore, the result value of the first instruction is written into the result value registration buffer 1230 by the execution ending operation. By this operation, the result value of the first instruction has been decided, and therefore, the first instruction operation information management entry 1290 is brought to the "em" condition. Furthermore, by the operand forwarding operation, this result value is forwarded to the right operand of the fifth instruction ("and" instruction), in accordance with the forward map information temporarily stored in the forward map prefetch buffer 1258 in the preceding cycle. Since the second instruction and the fourth instruction are in the EX2 stage, the operand forwarding reserving operation is executed, so that the forward map information for these instructions is transferred to the first row and the second row of the forward map prefetch buffer 1258, and the third instruction and the fifth instruction are brought into the "rd" condition. In the instruction issue operation, the forward map information of the columns in the forward map prefetch buffer 1258, corresponding to these instructions, (hatched in FIG. 19), is transferred to the second column and the third column of each of the instruction issue buffer 1240 and the bypass map buffer 1220, respectively. With the operand bypassing operation, and in accordance with the instruction shown by the bypass map buffer 1220, the result value of the second instruction and the fourth instruction are bypassed to the right operand part 1244 in the second column and the third column in the instruction issue buffer 1240.

In the condition of t=5 shown in FIG. 20, since the execution of the second instruction is completed and decided, the instruction operation information management entry 1290 for this second instruction is brought to the "em" condition. In addition, since the execution of the fourth instruction is completed but has not yet been decided, the result value of the fourth instruction is written into the fourth result value registration entry 1235, and the corresponding execution flag is set to the "do" condition. The result value of these instructions are forwarded into the instruction registration buffer 1200 by the operand forwarding operation. Since the third and fourth instructions are in the EX2 stage, the issue flags of the sixth and seventh instructions are brought into the "rd" condition by the operand forwarding reserving operation. These sixth and seventh instructions are transferred together with the corresponding bypass map information to the instruction issue buffer 1240 and the bypass map buffer 1220. On the instruction issue buffer 1240, the result values of the second and fourth instructions are bypassed to the input operands of these instructions.

In the condition of t=6 shown in FIG. 21, the execution of the third and fifth instructions are completed, the results of the execution of the third to fifth instructions are decided. The execution results of the third and fifth instructions are forwarded to the instruction registration buffer 1200 by the operand forwarding operation. In this cycle, the seventh instruction is in the EX2 stage, but since the forward map information for this instruction is all "0", there is no instruction for causing the issue flag into "rd" by the operand forwarding reserving operation.

In the condition of t=7 shown in FIG. 22, the execution of the seventh instruction is completed, and the result value of the seventh instruction is written into the result value registration buffer 1230. In addition, the sixth instruction is in the EX2 stage, and the forward map information of this instruction is read out to the forward map prefetch buffer 1258, by the operand forwarding reserving operation. Since the issue flags for the eighth and ninth instructions are brought into the "rd" condition, these instructions and the corresponding bypass map information are transferred to the instruction issue buffer 1240 and the bypass map buffer 1220, by the instruction issue operation. The instruction issue buffer 1240 is bypassed by the operand bypass operation in connection with the result value.

In the condition of t=8 shown in FIG. 23, the execution of the sixth instruction is completed, and therefore, the result values of the sixth and seventh instructions are decided. The result value of the seventh instruction is written back to the register file 13 from the result value registration buffer 1230. In addition, the result value is forwarded to the instruction registration buffer 1200 by the operand forwarding operation. Furthermore, the eight and ninth instructions are executed, but the execution of the "branch" instruction of the eighth instruction has not yet been completed, the "store" instruction of the ninth instruction is executed in the speculative execution condition on the basis of a branch prediction that the branch does not hold, and therefore, the execution flag is brought to the "es" condition.

In the condition of t=9 shown in FIG. 24, the execution of the "branch" instruction of the eighth instruction is completed, and it is found that the branch did not hold. Therefore, the execution flag for the ninth instruction is brought from the "es" condition into the "ex" condition. In addition, since the execution of the eighth instruction is decided, the instruction operation information management entry 1290 for the eighth instruction is brought to the "em" condition.

As mentioned above, by supplying the result value of an instruction to an input operand of another instruction by using the forward map information and by means of the operand forwarding or the operand bypassing, the instructions can be executed and the execution can be completed from instructions whose operand(s) has become complete, without using a comparator.

Referring to FIG. 25, there is shown a block diagram illustrating an example of the forward map buffer 1210 incorporated in the multiple instruction parallel issue/execution management unit 12 shown in FIG. 6. In order to correspond to the above mentioned description, FIG. 25 shows only a construction for registering the forward map information for one instruction and for reading the forward map information for one result value. Furthermore, the registration of the forward map information is executed in the instruction registration operation, and the reading of the forward map information is executed in the operand forwarding reserving operation.

As shown in FIG. 25, the forward map buffer 1210 includes a number of memory cells 12105 arranged in the form of matrix having "N" rows and "2N" columns. Each pair of adjacent memory cells 12105 in a row direction constitute one foreword bit part 215. One row of memory cells 12015 correspond to one forward source entry 1216. The forward map buffer 1210 has "N" word lines 12106 and "2N" bit lines 12107, so that one memory cell 12105 is located at each of intersections between the word lines 12106 and the bit lines 12107 and is connected to one word line 12106 and on bit line 12107 at the intersection.

First, the registration of the forward map information in the instruction registration operation will be described. The forward map information subjected to the left cyclic shifting and the "0" extension by the shifter 1280, is supplied through the forward map registration terminals 1213. Into which of the forward source entries 1216 the supplied forward map information is to be registered, namely, into which of memory cell rows in FIG. 25 the supplied forward map information is to be registered, is instructed through the forward map registration/output terminals 1211. The two-bit forward map information supplied through each of the forward map registration terminals 1213 is supplied to a write circuit 12102, which receives the issue flag given through a corresponding selector 12104 and a corresponding forward map output/issue flag input terminal 1212. When the value of the issue flag "–" or "rd" and at least one bit of two bits of forward map information is "1", the forward map information is not registered and the registration is stalled until the value of the issue flag becomes a value other than "–" and "rd". Otherwise, the write circuit 12102 drives a pair of adjacent bit lines 12107 to signal levels designated by the two-bit forward map information. On the other hand, by a word line driver 12101 connected to the forward map registration/output control terminal 1211 given with the value "1" all the memory cells connected to the word line driven to the value "1" are put into a writable condition. Thus, the signal values of the respective bit lines 12107 are written into the memory cells connected to the word line driven to the value "1".

Next, the reading of the forward map information in the operand forwarding reserving operation will be described. One row of memory cells 12105 to be read out are designated through the forward map registration/output control terminals 1211, so that only the word line 12106 corresponding to the designated row is driven to the signal value "1", and the other word lines are driven to the signal value "0". Thus, only the forward map information stored in the memory cells 12106 of the row driven to the signal value "1", is read out to the bit lines 12107 by reading circuits 12103, and then, outputted through the selector 12104 and the forward map output/issue flag input terminals 1212.

In the example shown in FIG. 25, considering that only one word line 12106 and one bit line 12107 are shown for one instruction, in the actual forward map buffer 1210, a plurality of word lines and a plurality of bit lines are provided. Specifically, assuming that "L" instructions are simultaneously decoded and "K" instructions are simultaneously issued, the word lines and the bit lines of the number equal to a larger one of "L" and "K", are required.

Referring to FIG. 26, there is shown a block diagram illustrating an example of the forward map prefetch buffer 1258 incorporated in the multiple instruction parallel issue/execution management unit 12 shown in FIG. 6. Similarly to FIG. 25, FIG. 26 shows a construction for receiving and outputting the forward map information concerning one result value and for outputting the bypass map information for one instruction issue. As mentioned above, the receiving of the forward map information is executed in the operand forwarding reserving operation, and the outputting of the forward map information is executed in the operand forwarding operation. The outputting of the bypass map information is executed in the instruction issue operation.

The forward map prefetch buffer 1258 includes a number of memory cells 12585 arranged in the form of a matrix having "J" rows and "2N" columns. "J" is the maximum number of instructions, execution of which can be simultaneously completed. Each pair of adjacent memory cells 12585 in a row direction constitute one foreword bit part 12585. One row of memory cells 12585 correspond to one forward source entry 12586. Each memory cell is connected to one row direction word line 125861, one column direction word line 125862, one row direction bit line 125871 and one column direction bit line 125872. Thus, the forward map prefetch buffer 1258 of the shown embodiment constitutes a so called orthogonal memory in which each of the word line and the bit line extends in a vertical direction and in a horizontal direction.

First, the receiving of the forward map information in the operand forwarding reserving operation, will be described. The forward map information read out from the forward map buffer 1210, is used for controlling the issue flag in the instruction issue control unit 1250, and thereafter, is supplied from the forward map input terminals 125801 to the forward map prefetch buffer 1258, and then, applied through write circuits 12582 to the column direction bit lines 125872. Into which of the rows the forward map information is registered, is instructed from the instruction issue control unit 1250 through the forward map input/output control terminals 125804, by driving the row direction word lines 125861 by word line drivers 12581 connected to the forward map input/output control terminals 125861.

When the forward map information is outputted in the operand forwarding operation, one of the row direction word lines 125861 is selected and driven by the forward map input/output control terminals 125804, so that the forward map information on the selected row is outputted through the column direction bit lines 125872 connected to reading circuits 12583 and the forward map output terminals 125805.

The outputting of the bypass map information in the instruction issue operation is executed as follows: From which of the columns the forward map information is outputted as the bypass map information, is instructed from the instruction issue control unit 1250 through the bypass map input terminals 125801 and word line driver 12581 connected between the bypass map input terminals 125801 and the column direction word lines 125862. Here, the column instructed is the same column of the instruction registration entry storing the instruction to be issued, in the instruction registration buffer 1200. Thus, the column direction word line 125862 corresponding to the column instructed is selected, so that the forward map information on that column is outputted as the bypass map information through the row direction bit lines 125871, a reading circuits 12583 connected to the row direction bit lines 125871, and the bypass map output terminals 1254.

In the example shown in FIG. 26, considering that only one row direction word line 125861, one column direction word line 125862, one row direction bit line 125871 and one column direction bit line 125872 are shown for one instruction, in the actual forward map prefetch buffer 1258, a plurality of row direction word lines, a plurality of column direction word lines, a plurality of row direction bit lines and a plurality of column direction bit lines are provided. Specifically, assuming that "K" instructions are simultaneously issued and "J" instructions are simultaneously executed and ended, "J" row direction word lines 125861 and "J" column direction bit lines 125872, and "2K" column direction word lines 125862 and "2K" row direction bit lines are required.

Referring to FIG. 27, there is shown a block diagram illustrating an example of the bypass map buffer 1220 incorporated in the multiple instruction parallel issue/execution management unit 12 shown in FIG. 6. Similarly to FIG. 26, FIG. 27 shows a construction for registering the bypass map information for one instruction issue and for outputting the bypass map information for one result value. As mentioned above, the registration of the bypass map information is executed in the instruction issue operation, and the output of the bypass map information is executed in the operand bypassing operation.

The forward map buffer 1220 includes a number of memory cells 12205 arranged in the form of a matrix having "J" rows and "2N" columns. "J" is the maximum number of instructions, execution of which can be simultaneously completed. "K" is the maximum number of instructions which can be simultaneously issued. Each pair of adjacent memory cells 12205 in a row direction constitute one bypass bit part 1225. One row of memory cells 12205 correspond to one bypass source entry 1226. Each memory cell is connected to one row direction word line 12206, one column direction word line 12208, one row direction bit line 12209 and one column direction bit line 12207. Thus, the forward map buffer 1220 of the shown embodiment constitutes the orthogonal memory in which each of the word line and the bit line extends in a vertical direction and in a horizontal direction.

First, the registration of the bypass map information in the instruction issue operation, will be described. The bypass map information read out from the forward map prefetch buffer 1258 is inputted through the bypass map registration terminals 1223 and associated write circuits 12202 to the row direction bit lines 12209. Into which of the columns the bypass map information is to be registered, is instructed, in accordance with the instructions to be issued, from the instruction issue control unit 1250 through the bypass map registration/output control terminal 1221 connected to a decoder 12204 having a number of decode outputs connected through word line drivers 12201 to the column direction word lines 12208. Thus, the bypass map information is registered into the memory cells 12205 connected to the selected column direction word line 12208.

Next, the output of the bypass map information in the operand bypassing operation will be described. From which of the columns the bypass map information is to be outputted, is instructed, in accordance with the generated result value, from the instruction execution control unit 1260 through the bypass map registration/output control terminal 1221 connected to a decoder 12204 having a number of decode outputs connected through word line drivers 12201 to the row direction word lines 12206. Thus, the bypass map information in the memory cells 12205 connected to the selected row direction word line 12206, is read out through the column direction bit lines 12207, associated reading circuits 12203 and the bypass map output terminals 1222.

In FIG. 27, considering that only one row direction word line 12206, one column direction word line 12208, one row direction bit line 12209 and one column direction bit line 12207 are provided for one instruction, in the actual bypass map buffer 1220, a plurality of row direction word lines 12206, a plurality of column direction word lines 12208, a plurality of row direction bit lines 12209 and a plurality of column direction bit lines 12207 are provided. Specifically, assuming that "K" instructions are simultaneously issued and "J" instructions are simultaneously executed and ended, "J" row direction word lines 12206, "J" plurality of column direction bit lines 12207, "2K" column direction word lines 12208 and "2K" row direction bit lines 12209 are required.

Referring to FIG. 28, there is shown a block diagram illustrating the construction of one instruction registration entry 1205 in the instruction registration buffer 1200 incorporated in the multiple instruction parallel issue/execution management unit 12 shown in FIG. 6. FIG. 28 illustrates a connection relation between the input/output terminals of the instruction registration buffer 1200 and the instruction code part 1202, the left operand part 1203 and the right operand part 1204.

The instruction registration entry designation terminal 1201 is connected through an instruction code registration designating line 12012 to the instruction code part 1202, through a left operand registration designating line 12013 to the left operand part 1203, through a right operand registration designating line 12014 to the right operand part 1204, and through an instruction operation information output designating line 12011 to the instruction code part 1202, the left operand part 1203 and the right operand part 1204. These lines are signal lines for controlling the registration and the outputting of the instruction code part 1202, the left operand part 1203 and the right operand part 1204.

When the instruction code is registered, the instruction code supplied through the instruction code registration terminal 1206 is registered into the instruction code part 1202 designated from the instruction registration entry designation terminal 1201 through the instruction code registration designating line 12012. When left and/or right the input operand is registered, the input operand supplied through the register operand input terminal 1209 or the operand forward input terminal 1208, is registered to the left operand part 1203 or the right operand part 1204 or both, designated from the instruction registration entry designation terminal 1201 through the left operand registration designating line 12013 or through the right operand registration designating line 12014. When the operand is registered into the left operand part 1203, the signal value supplied to the instruction registration entry designation terminal 1201 is "10", and when the operand is registered into the right operand part 1204, the signal value supplied to the instruction registration entry designation terminal 1201 is "01". When the operand is registered into both the left and right operand parts 1203 and 1204, the signal value supplied to the instruction registration entry designation terminal 1201 is "11". When the instruction operation information is outputted, the instruction operation information is outputted to the instruction output terminal 1207 from the instruction registration entry 1205 designated from the instruction registration entry designation terminal 1201 through the instruction operation information output designating line 12011.

When the operand forwarding operation is executed, the two-bit forward map information is supplied from the instruction registration entry designation terminal 1201. Respective bits of the two-bit forward map information are supplied to the left operand registration designating line 12013 and the right operand registration designating line 12014, respectively, one bit for one line. Thus, the above mentioned selection of the left operand part 1203 and the right operand part 1204, can be realized. Therefore, when the input operand is registered in the operand forwarding operation, one operand can be registered into any number of the left operand parts 1203 and any number of the right operand parts 1204, differently from the case that the instruction code is registered.

Referring to FIG. 29, there is shown a block diagram of another construction example of the multiple instruction parallel issue/execution management unit 12. In FIG. 29, elements similar to those shown in FIG. 6 are given the same Reference Numerals, and explanation thereof will be omitted.

The second example of the multiple instruction parallel issue/execution management unit 12 shown in FIG. 29 is different in construction from the first example of the multiple instruction parallel issue/execution management unit 12 shown in FIG. 6, in that the instruction execution control unit 1260 has a result value registration entry designation terminal 1265, which is connected to the register file read data terminal 124, and in that the result value registration buffer 1230 has a result value tentative output terminal 1238, which is connected to the register operand input terminal 1209.

Furthermore, the multiple instruction parallel issue/execution management unit 12 shown in FIG. 29 is different from the multiple instruction parallel issue/execution management unit 12 shown in FIG. 6, in the operation when the result value to be written into the register 135 designated by a given instruction as an input operand, still exists in the result value registration buffer 1230. In this case, in the multiple instruction parallel issue/execution management unit 12 shown in FIG. 6, the operand registration operation for the given instruction is stalled until the result value is written into the register 135.

In this case, on the other hand, in the multiple instruction parallel issue/execution management unit 12 shown in FIG. 29, the number of the result value registration entry 1235 having the result value is received through the register file read data terminal 124 from the register file 13, and supplied through the result value registration entry designation terminal 1265 to the instruction execution control unit 1260. This instruction execution control unit 1260 instructs to read the result value from the result value registration entry 1235 in the result value registration buffer 1230, and to register the result value read out through the result value tentative output terminal 1238, to the instruction registration buffer 1200 through the register operand input terminal 1209.

The multiple instruction parallel issue/execution management units 12 shown in FIGS. 6 and 29 are characterized in that the instruction operation information management entries are cyclically used. This can be realized by using the construction of a cyclic FIFO (first-in, first-out) buffer. Alternatively, the multiple instruction parallel issue/execution management units 12 can be constructed by using a shift type FIFO buffer. In this case, as soon as the execution of an instruction is decided and the instruction operation information of that instruction is erased, the content of the instruction operation information management entry 1290 of a next instruction is shifted into the instruction operation information management entry 1290 which has become empty. If the construction is adopted, the shifter 1280 is no longer necessary. Instead, it is required that the instruction registration buffer 1200 and the instruction issue control unit 1250 have a right shifting mechanism in the row direction, and the forward map buffer 1210 has a shifting mechanism into a rightdown diagonal direction, and the result value registration buffer 1230 has a down shifting mechanism in the column direction.

In the above mentioned multiple instruction parallel issue/execution management units, the forward map information is previously encoded and included in an instruction, and after the instruction decoding, the forward map information is registered in the forward map buffer, and furthermore, just before the result value is generated by the execution of the instruction, the forward map information is read out from the forward map buffer, and the dependency between the result value and input operands is specified. Since the dependency between the result value and input operands is statically previously given, the multiple instruction parallel issue/execution management unit no longer requires a large amount of comparators and parallel operation of the large amount of comparators, which were required in the prior art.

The forward map buffer used in the multiple instruction parallel issue/execution management unit 12 has a regulated memory cell array construction as mentioned above. In addition, by holding the forward map information corresponding to some result value, as a one-row information connected to one word line, it is possible to easily realize the registration and reading of the forward map information by a writing and reading operation in a conventional memory. Accordingly, the forward map buffer can remarkably reduce the complication, the circuit scale and the consumed electric power, in comparison with the not-yet-issued instruction entry and the executed instruction entry in the prior art multiple instruction parallel issue/execution management unit constructed by adding a number of comparators to each one memory cell.

In the prior art multiple instruction parallel issue/execution management unit, the detection of the dependency between the result value and the input operands and the forwarding of the result value to the input operands, were reactively executed. Here, "reactively" indicates that the input operand side waits for the necessary result value and receives the necessary result value when the necessary result value is generated. In this method, it is necessary to compare the register number and the instruction tag by using a large number of comparators as mentioned above.

On the other hand, the multiple instruction parallel issue/execution management unit in accordance with the present invention, actively executes the detection of the dependency between the result value and the input operands and the forwarding of the result value to the input operands. Here, "actively" indicates that the result value side has the knowledge that there exists an input operand requires the result value of the result value side, and in accordance with the knowledge, the result value side positively supplies the result value to the input operand side when the result value is generated. In this method, it is no longer necessary to compare the instruction tag by using a large number of comparators as mentioned above.

Furthermore, the simultaneous parallel multiple access to the register file has become a bottle neck, similarly to the parallel operation of a large number of comparators, in issuing and executing a plurality of instructions in parallel on the basis of the prior art superscalar technology. However, the multiple instruction parallel issue/execution management unit in accordance with the present invention is configured to give the result value directly to the input operand by the operand forwarding operation. As a result, it is possible to reduce the number of accesses to the register file, including the writing of the result value into the register file and the reading of the input operand from the regatta file.

In addition, the forward map information used in the multiple instruction parallel issue/execution management unit in accordance with the present invention, can be simply generated by using an object conversion from the program code using the instruction set architecture of the prior art microprocessor. The reason for this is as follows: Into which of registers the result value is to be written, and which of the registers is designated by the input operand, are statically shown in the program code, and therefore, by analyzing this information, it is possible to statically know the dependency between the result value and the input operand. For the same reasoning, it is possible to compile from a high level language program without any program.

Moreover, the forward map information used in the multiple instruction parallel issue/execution management unit in accordance with the present invention, indicates the dependency between the result value of a given instruction and input operands of instructions, which succeed to the given instruction in a predetermined range or which precede and succeed to the given instruction in a predetermined range. Therefore, it is possible to show the dependency of any number of input operands if these input operands are included in the predetermined range. In a program code processed by a processor, there are frequently generated such a situation that the result value of a given instruction is used as an input operand by many instructions in a neighboring range. Therefore, a more efficient multiple instruction parallel issue/execution management unit can be realized by the forward map information as mentioned above.

The invention has thus been shown and described with reference to the specific embodiments. However, it should be noted that the present invention is in no way limited to the details of the illustrated structures but changes and modifications may be made within the scope of the appended claims.

For example, a plurality of instruction issue buffers can be provided in place of the only one instruction issue buffer, so that the instruction issue buffers are separately used in accordance with the kind of the instruction to be issued.

In addition, in place of transferring only issuable instructions from the instruction registration buffer to the instruction issue buffer, whether or not the instruction is issuable, is checked on the instruction issue buffer. In this case, the issue flag is moved from the instruction issue control unit to the instruction issue buffer.

The above mentioned description did not explain whether or not the embodiments includes a floating-point arithmetic unit. The embodiments can be used as without modification other than replacing the arithmetic and logic unit by a floating-point arithmetic unit.

Furthermore, in the forward map buffer, the forward map prefetch buffer and the bypass buffer, each bit line is constituted of a single line, but can be constituted of a pair of a complementary signal lines.

As mentioned above, the processor including the multiple instruction parallel issue/execution management unit in accordance with the present invention, is characterized in that the forward map buffer is provided within the multiple instruction parallel issue/execution management unit, and the dependency between the result value and the input operands is statically designated in the instruction, and held in the forward map buffer. With this arrangement, it is possible to forward the result value to the input operand with using no comparator. In addition, the operation required for all the multiple instruction parallel issue/execution management is realized by the writing operation and the reading operation to the memory cells. Therefore, a large number of comparators and a control circuit for collation operation of the comparators are no longer necessary. Accordingly, the circuit construction of the multiple instruction parallel issue/execution management unit and the processor including the multiple instruction parallel issue/execution management unit can be reduced.

In the multiple instruction parallel issue/execution management unit in accordance with the present invention, only the memory cells connected to the designated row-direction or column-direction word line are activated, the consumed electric power can be reduced in comparison with the prior art multiple instruction parallel issue/execution management unit in which all the comparators are operated simultaneously in parallel for the parallel collation.

Furthermore, in the multiple instruction parallel issue/execution management unit in accordance with the present invention, when the result value can be given as the input operand by the operand forwarding operation, the result value is not written into the register file. Therefore, the number of accesses to the register file can be reduced. Accordingly, it is possible to avoid the complication of the register file, which was a problem in the prior art processor, by increasing the number of instructions which are-executed in parallel, and by increasing the number of simultaneous readings/writings to the register file.

I claim:

1. A multiple instruction parallel issue/execution management system incorporated in a superscalar type processor configured to dynamically issue and execute a plurality of instructions in parallel, the system including:

a forward map buffer storing forward map information indicating whether or not a result value generated by execution of a given instruction is used as an input operand in other instructions, said forward map information being stored in a predetermined field of an instruction format, said forward map buffer previously storing said forward map information for said result value, before said result value corresponding to said given instruction is actually generated, so that when said result value corresponding to said given instruction is actually generated, anoperand using said result value is specified by using said previously stored forward map information corresponding to said result value, and supplied to an instruction using said result value as said operand.

2. A multiple instruction parallel issue/execution management system claimed in claim 1, wherein in said predetermined field of said given instruction storing said forward map information, there is set a relative input operand number for indicating a necessary input operand, so that an input operand using said result value of said given instruction can be designated from said relative input operand number, and wherein when said forward map information for said given instruction is set, said relative input operand number is determined by counting input operands from an input operand of an instruction next to said given instruction to said input operand using said result value of said given instruction, in accordance with the order of a statically determined instruction address order, so that the relative input operand number of an input operand of an instruction positioned after said given instruction in said statically determined instruction address order, can be designated.

3. A multiple instruction parallel issue/execution management system claimed in claim 1, wherein in said predetermined field of said given instruction storing said forward map information, there is set a relative input operand number for indicating a necessary input operand, so that an input operand using said result value of said given instruction can be designated from said relative input operand number, and wherein when said forward map information for said given instruction is set, said relative input operand number is determined by counting input operands from an input operand of an instruction positioned before said given instruction in a statically determined instruction address order, to said input operand using said result value of said given instruction, in accordance with said statically determined instruction address order, so that the relative input operand number of an input operand of an instruction positioned before or after said given instruction in said statically determined instruction address order, can be designated.

4. A multiple instruction parallel issue/execution management system claimed in claim 1, wherein in said predetermined field of said given instruction storing said forward map information, there are set a relative instruction number and a relative input operand number, for indicating a necessary input operand, so that an input operand using said result value of said given instruction can be designated from said relative input operand number.

5. A multiple instruction parallel issue/execution management system claimed in claim 4, wherein when said forward map information for said given instruction is set, said relative input operand number is determined by counting input operands from an input operand of an instruction next to said given instruction to said input operand using said result value of said given instruction, in accordance with the order of a statically determined instruction address order, so that the relative input operand number of an input operand of an instruction positioned after said given instruction in said statically determined instruction address order, can be designated.

6. A multiple instruction parallel issue/execution management system claimed in claim 4, wherein when said forward map information for said given instruction is set, said relative input operand number is determined by counting input operands from an input operand of an instruction positioned before said given instruction in a statically determined instruction address order, to said input operand using said result value of said given instruction, in accordance with said statically determined instruction address order, so that the relative input operand number of an input operand of an instruction positioned before or after said given instruction in said statically determined instruction address order, can be designated.

7. A multiple instruction parallel issue/execution management system claimed in claim 1, wherein said given instruction having said predetermined field for storing said forward map information is an instruction which is selected from the group consisting of an arithmetic/logic instruction and a memory access instruction and which includes an instruction code designating the kind of operation, a register field for designating a register into which said result value is to be written and a register from which an input operand is to be read out, and said predetermined field for storing said forward map information, said selected instruction being in a format selected from the group of a fixed length instruction format in which when it is not necessary to designate said register into which said result value is to be written and said register from which said input operand is to be read out, said forward map information is stored in said register field, and a variable length instruction format in which when it is not necessary to designate said register into which said result value is to be written and said register from which said input operand is to be read out, said register field is omitted.

8. A multiple instruction parallel issue/execution management system claimed in claim 1, wherein said given instruction having said predetermined field for storing said forward map information is an instruction which is selected from the group consisting of an arithmetic/logic instruction which includes an instruction code and said predetermined field for storing said forward map information, a memory access instruction which includes an instruction code and said predetermined field for storing said forward map information, and a register access instruction which includes an instruction code, said predetermined field for storing said forward map information, and a field for designating a register for a writing or a reading.

9. A multiple instruction parallel issue/execution management system claimed in claim 1, wherein said forward map buffer stores said forward map information constituted of forward bits each of which is composed of one bit and which are arranged in a matrix form having a first number of rows and a second number of rows, for storing said first number of result values and said second number of input operands each of which uses any one of said first number of result values, so that by setting a specific value into the forward bit at a (t)th row and at a (s)th column, it is possible to set whether or not a (t)th result value of said first number of result values is used by a (s)th input operand of said second number of input operands, and wherein when said given instruction is decoded, said forward map information of said given instruction is subjected to a shifting and a "0" extension, to generate said forward map information composed of said second number of bits, which is stored in said forward map buffer as one row of forward map information.

10. A multiple instruction parallel issue/execution management system claimed in claim 9, further including an instruction registration buffer having said first number of instruction registration entries, for registering a plurality of decoded instruction and input operands used by said plurality of decoded instruction.

11. A multiple instruction parallel issue/execution management system claimed in claim 10, wherein when the result value is generated by execution of said given instruction, if said result value is at a place of a number of row of said forward map buffer formed in the matrix form, and at least one input operand using said result value and hence at least one instruction using said result value as an input operand, are identified on the basis of said forward bits of said second number read out from said third number row of said forward map buffer, and when said at least one instruction thus identified is registered in at least one instruction registration entry of said instruction registration buffer, said result value is registered into said at lease one instruction registration entry.

12. A multiple instruction parallel issue/execution management system claimed in claim 11, wherein input operands of said second number registrable in said instruction registration buffer are registered in the columns of said second number of said forward map buffer, in a one-to-one relation, respectively, so that when said forward bits of said second number are read out from said third number row of said forward map buffer, whether or not said result value of said given instruction is registered as an input operand for each of said input operands registered in said instruction registration buffer, is discriminated on the basis of the value of a corresponding bit of said forward bits thus read out, and for a plurality of input operands for which said result value of said given instruction is discriminated to be registered, said result value of said given instruction is simultaneously registered in parallel into the instruction registration entries, of said instruction registration buffer, corresponding to said plurality of input operands for which said result value of said given instruction is discriminated to be registered.

13. A multiple instruction parallel issue/execution management system claimed in claim 12, wherein said result value of said given instruction is written into said instruction registration entry of said instruction registration buffer, so that said result value of said given instruction is used as an input operand of another instruction.

\* \* \* \* \*

UNITED STATES PATENT AND TRADEMARK OFFICE
CERTIFICATE OF CORRECTION

PATENT NO. : 5,958,043
DATED : September 28, 1999
INVENTOR(S) : Masato MOTOMURA

It is certified that error appears in the above-indentified patent and that said Letters Patent is hereby corrected as shown below:

On the title page,

Line [22] Filed: delete "Aug. 21, 1997" and insert --Sept. 2, 1997--.

Signed and Sealed this

Twentieth Day of March, 2001

*Attest:*

NICHOLAS P. GODICI

*Attesting Officer*  *Acting Director of the United States Patent and Trademark Office*